(12) United States Patent
Wang et al.

(10) Patent No.: US 10,803,231 B1
(45) Date of Patent: Oct. 13, 2020

(54) PERFORMING TAG-BASED FONT RETRIEVAL USING COMBINED FONT TAG RECOGNITION AND TAG-BASED FONT RETRIEVAL NEURAL NETWORKS

(71) Applicant: Adobe Inc., San Jose, CA (US)

(72) Inventors: Zhaowen Wang, San Jose, CA (US); Tianlang Chen, Rochester, NY (US); Ning Xu, Urbana, IL (US); Hailin Jin, San Jose, CA (US)

(73) Assignee: ADOBE INC., San Jose, CA (US)

( * ) Notice: Subject to any disclaimer, the term of this patent is extended or adjusted under 35 U.S.C. 154(b) by 0 days.

(21) Appl. No.: 16/369,893

(22) Filed: Mar. 29, 2019

(51) Int. Cl.
*G06F 17/00* (2019.01)
*G06F 40/109* (2020.01)
*G06K 9/68* (2006.01)
*G06F 16/33* (2019.01)
*G06N 3/08* (2006.01)
*G06K 9/62* (2006.01)

(52) U.S. Cl.
CPC .......... *G06F 40/109* (2020.01); *G06F 16/334* (2019.01); *G06K 9/6257* (2013.01); *G06K 9/6828* (2013.01); *G06N 3/08* (2013.01)

(58) Field of Classification Search
CPC ............................. G06F 40/109; G06F 16/334
USPC ................................................. 715/269, 200
See application file for complete search history.

(56) References Cited

U.S. PATENT DOCUMENTS

| | | | |
|---|---|---|---|
| 9,501,724 B1 * | 11/2016 | Yang | G06K 9/6828 |
| 10,169,304 B1 * | 1/2019 | Joshi | G06F 40/109 |
| 2012/0093396 A1 | 4/2012 | Dai et al. | |
| 2017/0098138 A1 * | 4/2017 | Wang | G06K 9/6257 |
| 2017/0098140 A1 * | 4/2017 | Wang | G06K 9/52 |
| 2017/0228870 A1 * | 8/2017 | Chavez | G06T 7/11 |
| 2018/0089151 A1 * | 3/2018 | Wang | G06F 40/109 |
| 2018/0365536 A1 * | 12/2018 | Wang | G06N 3/08 |
| 2019/0130232 A1 | 5/2019 | Kaasila et al. | |
| 2020/0012943 A1 * | 1/2020 | Neves | G06F 16/24568 |
| 2020/0143191 A1 | 5/2020 | Du et al. | |
| 2020/0193299 A1 | 6/2020 | Geva et al. | |

OTHER PUBLICATIONS

P. Anderson, X. He, C. Buehler, D. Teney, M. Johnson, S. Gould, and L. Zhang. Bottom-up and top-down attention for image captioning and vqa. arXiv preprint arXiv:1707.07998, 2017.

(Continued)

*Primary Examiner* — Manglesh M Patel
(74) *Attorney, Agent, or Firm* — Keller Jolley Preece

(57) ABSTRACT

The present disclosure describes a font retrieval system that utilizes a multi-learning framework to develop and improve tag-based font recognition using deep learning neural networks. In particular, the font retrieval system jointly utilizes a combined recognition/retrieval model to generate font affinity scores corresponding to a list of font tags. Further, based on the font affinity scores, the font retrieval system identifies one or more fonts to recommend in response to the list of font tags such that the one or more provided fonts fairly reflect each of the font tags. Indeed, the font retrieval system utilizes a trained font retrieval neural network to efficiently and accurately identify and retrieve fonts in response to a text font tag query.

20 Claims, 12 Drawing Sheets

(56) References Cited

OTHER PUBLICATIONS

S. Azadi, M. Fisher, V. Kim, Z. Wang, E. Shechtman, and T. Darrell. Multi-content gan for few-shot font style transfer. In Proceedings of the IEEE Conference on Computer Vision and Pattern Recognition, vol. 11, p. 13, 2018.
G. Chen, J. Yang, H. Jin, J. Brandt, E. Shechtman, A. Agarwala, and T. X. Han. Large-scale visual font recognition. In Proceedings of the IEEE Conference on Computer Vision and Pattern Recognition, pp. 3598-3605, 2014.
J. H. Friedman. Greedy function approximation: a gradient boosting machine. Annals of statistics, pp. 1189-1232, 2001.
A. Frome, G. S. Corrado, J. Shlens, S. Bengio, J. Dean, T. Mikolov, et al. Devise: A deep visual-semantic embedding model. In Advances in neural information processing systems, pp. 2121-2129, 2013.
I. Goodfellow, J. Pouget-Abadie, M. Mirza, B. Xu, D. Warde-Farley, S. Ozair, A. Courville, and Y. Bengio. Generative adversarial nets. In Advances in neural information processing systems, pp. 2672-2680, 2014.
J. Gu, J. Cai, S. Joty, L. Niu, and G. Wang. Look, imagine and match: Improving textual-visual cross-modal retrieval with generative models. In Proceedings of the IEEE Conference on Computer Vision and Pattern Recognition, pp. 7181-7189, 2018.
P. Isola, J.-Y. Zhu, T. Zhou, and A. A. Efros. Image-to-image translation with conditional adversarial networks. arXiv preprint, 2017.
J.-H. Kim, S.-W. Lee, D. Kwak, M.-O. Heo, J. Kim, J.-W. Ha, and B.-T. Zhang. Multimodal residual learning for visual qa. In Advances in Neural Information Processing Systems, pp. 361-369, 2016.
C. H. Lampert, H. Nickisch, and S. Harmeling. Learning to detect unseen object classes by between-class attribute transfer. In Computer Vision and Pattern Recognition, 2009. CVPR 2009. IEEE Conference on, pp. 951-958. IEEE, 2009.
K.-H. Lee, X. Chen, G. Hua, H. Hu, and X. He. Stacked cross attention for image-text matching. arXiv preprint arXiv:1803.08024, 2018.
S. Li, T. Xiao, H. Li, W. Yang, and X. Wang. Identity-aware textual-visual matching with latent co-attention. In Computer Vision (ICCV), 2017 IEEE International Conference on, pp. 1908-1917. IEEE, 2017.
S. Li, T. Xiao, H. Li, B. Zhou, D. Yue, and X. Wang. Person search with natural language description. arXiv preprint arXiv:1702.05729, 2017.
J. Lu, C. Xiong, D. Parikh, and R. Socher. Knowing when to look: Adaptive attention via a visual sentinel for image captioning. In Proceedings of the IEEE Conference on Computer Vision and Pattern Recognition (CVPR), vol. 6, p. 2, 2017.
S. Ma, J. Fu, C. W. Chen, and T. Mei. Da-gan: Instance-level image translation by deep attention generative adversarial networks. In Proceedings of the IEEE Conference on Computer Vision and Pattern Recognition, pp. 5657-5666, 2018.
M. Mirza and S. Osindero. Conditional generative adversarial nets. arXiv preprint arXiv:1411.1784, 2014.
P. O'Donovan, J. Libeks, A. Agarwala, and A. Hertzmann. Exploratory font selection using crowdsourced attributes. ACM Transactions on Graphics (TOG), 33(4):92, 2014.
S. Reed, Z. Akata, H. Lee, and B. Schiele. Learning deep representations of fine-grained visual descriptions. In Proceedings of the IEEE Conference on Computer Vision and Pattern Recognition, pp. 49-58, 2016.
R. Socher, M. Ganjoo, C. D. Manning, and A. Ng. Zero-shot learning through cross-modal transfer. In Advances in neural information processing systems, pp. 935-943, 2013.
C. Wah, S. Branson, P. Welinder, P. Perona, and S. Belongie. The Caltech-UCSD Birds-200-2011 Dataset. Technical report, 2011.
B. Wang, Y. Yang, X. Xu, A. Hanjalic, and H. T. Shen. Adversarial cross-modal retrieval. In Proceedings of the 2017 ACM on Multimedia Conference, pp. 154-162. ACM, 2017.
Y. Wang, Z. Lian, Y. Tang, and J. Xiao. Font recognition in natural images via transfer learning. In International Conference on Multimedia Modeling, pp. 229-240. Springer, 2018.
Z. Wang, J. Yang, H. Jin, E. Shechtman, A. Agarwala, J. Brandt, and T. S. Huang. Deepfont: Identify your font from an image. In Proceedings of the 23rd ACM international conference on Multimedia, pp. 451-459. ACM, 2015.
Y. Xian, B. Schiele, and Z. Akata. Zero-shot learning the good, the bad and the ugly. arXiv preprint arXiv:1703.04394, 2017.
F. S. Y. Yang, L. Zhang, T. Xiang, P. H. Torr, and T. M. Hospedales. Learning to compare: Relation network for few-shot learning. 2018.
Z. Yang, X. He, J. Gao, L. Deng, and A. Smola. Stacked attention networks for image question answering. In Proceedings of the IEEE Conference on Computer Vision and Pattern Recognition, pp. 21-29, 2016.
Q. You, H. Jin, Z. Wang, C. Fang, and J. Luo. Image captioning with semantic attention. In Proceedings of the IEEE conference on computer vision and pattern recognition, pp. 4651-4659, 2016.
Q. You, J. Luo, H. Jin, and J. Yang. Cross-modality consistent regression for joint visual-textual sentiment analysis of social multimedia. In Proceedings of the Ninth ACM international conference on Web search and data mining, pp. 13-22. ACM, 2016.
L. Zhang, T. Xiang, S. Gong, et al. Learning a deep embedding model for zero-shot learning. 2017.
X. Zhang, H. Lai, and J. Feng. Attention-aware deep adversarial hashing for cross-modal retrieval. In European Conference on Computer Vision, pp. 614-629. Springer, 2018.
Y. Zhang, Y. Zhang, and W. Cai. Separating style and content for generalized style transfer. In Proceedings of the IEEE Conference on Computer Vision and Pattern Recognition, vol. 1, 2018.
Z. Zheng, L. Zheng, M. Garrett, Y. Yang, and Y.-D. Shen. Dual-path convolutional image-text embedding. arXiv preprint arXiv:1711.05535, 2017.
B. Zhou, A. Lapedriza, A. Khosla, A. Oliva, and A. Torralba. Places: A 10 million image database for scene recognition. IEEE transactions on pattern analysis and machine intelligence, 40(6):1452-1464, 2018.
J.-Y. Zhu, T. Park, P. Isola, and A. A. Efros. Unpaired image-to-image translation using cycle-consistent adversarial networks. arXiv preprint, 2017.
Y. Zhu, T. Tan, and Y. Wang. Font recognition based on global texture analysis. IEEE Transactions on pattern analysis and machine intelligence, 23(10):1192-1200, 2001.
A. Zramdini and R. Ingold. Optical font recognition using typographical features. IEEE Transactions on Pattern Analysis & Machine Intelligence, (8):877-882, 1998.
U.S. Appl. No. 16/294,417, dated Jul. 29, 2020, Preinterview 1st Office Action.

* cited by examiner

Fig. 7B

PERFORMING TAG-BASED FONT RETRIEVAL USING COMBINED FONT TAG RECOGNITION AND TAG-BASED FONT RETRIEVAL NEURAL NETWORKS

BACKGROUND

Recent years have seen a proliferation in the use of computing devices in the area of digital typography with respect to creating and editing electronic documents. Indeed, it is now commonplace for individuals and businesses to use digital typography to create customized web pages, e-mails, magazines, marketing materials, and other electronic documents utilizing desktop and laptop computers, mobile devices, tablets, smartphones, or other computing devices.

Recent years have also seen an increase in the type and variety of digital fonts utilized in electronic documents. Individuals can find, access, and install digital fonts on a computing device for use in creating electronic documents from large repositories. For example, an electronic document can use digital fonts selected from a collection of thousands of digital fonts. These advances with respect to digital fonts have also introduced a number of challenges, particularly in the field of digital font retrieval.

SUMMARY

Embodiments of the present disclosure provide benefits and/or solve one or more of the foregoing or other problems in the art with systems, computer media, and methods for effectively recognizing digital fonts (or simply "fonts") based on multi-tag queries. For example, the disclosed systems utilize deep learning neural networks to identify fonts in response to multi-tag queries. More particularly, the disclosed systems can utilize a combination of a font tag recognition model and a tag-based font retrieval model to retrieve and provide one or more fonts based on a multi-tag query. Specifically, in various embodiments, the disclosed systems use a font tag recognition neural network to generate font tag probability vectors that indicate probabilities that a given font is associated with various tags. The disclosed systems then can provide the font tag probabilities corresponding to a multi-tag query to a tag-based font retrieval neural network that determines font affinity scores, which indicate an overall affinity of a font to the set of tags in the multi-tag query. The use of the tag-based font retrieval neural network to generate affinity scores, rather than simply combining the font tag probabilities of the tags in a multi-tag query, removes potential bias due to popular tags in the training corpus and provides a comprehensive measure of a font relative to a multi-tag query.

To illustrate, the disclosed systems can identify a set of font images that are labeled with font tags. Using the font images and tags, the disclosed systems can train a font tag recognition neural network to determine font tag probabilities that a given font corresponds to each font tag. Additionally, the disclosed systems can filter the font tag probabilities to generate filtered tag probabilities. The disclosed systems can then utilize the filtered tag probabilities to train a tag-based font retrieval neural network to learn to predict font affinity scores given a list of font tags. Once trained, the disclosed systems can utilize the tag-based font retrieval neural network to determine font affinity scores given an input query of one or more font tags. Further, the disclosed systems can utilize the font affinity scores to provide recommended fonts in response to the font tag query.

The following description sets forth additional features and advantages of one or more embodiments of the disclosed systems, computer media, and methods. In some cases, such features and advantages will be obvious to a skilled artisan from the description or may be learned by the practice of the disclosed embodiments.

BRIEF DESCRIPTION OF THE DRAWINGS

The detailed description provides one or more embodiments with additional specificity and detail through the use of the accompanying drawings, as briefly described below.

FIGS. 7A-7B illustrate example retrieved fonts based on font tag queries in accordance with one or more embodiments.

DETAILED DESCRIPTION

Figure 1:
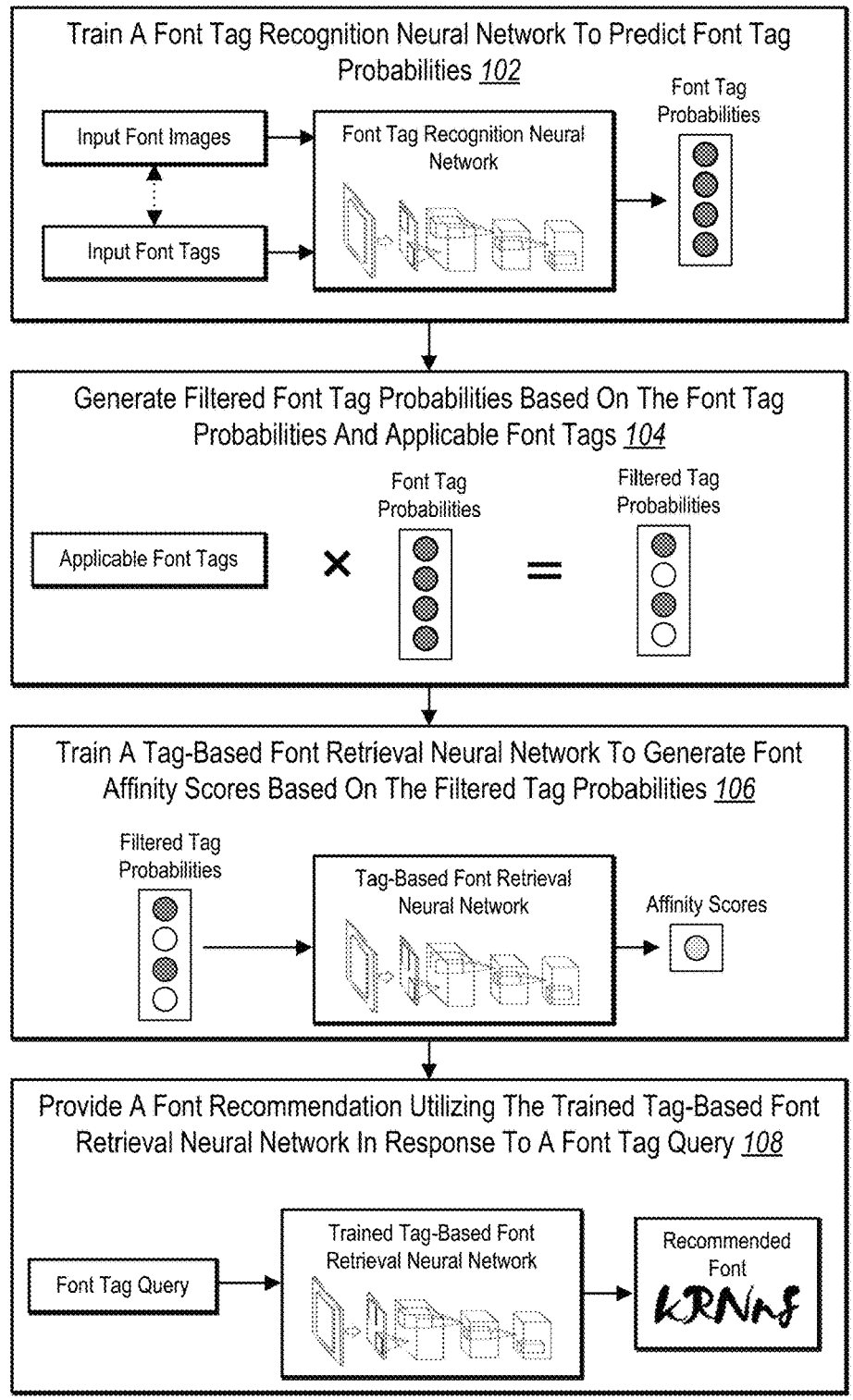
FIG. 1 illustrates a diagram of a general process for training and utilizing tag-based font neural networks to provide recommended fonts in response to a font tag query in accordance with one or more embodiments.

This disclosure describes one or more embodiments of a font retrieval system that utilizes a multi-learning framework to develop and improve tag-based font retrieval using deep learning neural networks. In particular, the font retrieval system can utilize a combined recognition/retrieval model to generate font affinity scores corresponding to font tags in a query. Further, utilizing the font affinity scores, the font retrieval system can identify one or more fonts to recommend in response to receiving the query.

More particularly, the font retrieval system can utilize a font tag recognition neural network to determine probabilities that font tags apply to given fonts. In particular embodiments, the font retrieval system utilizes the font tag recognition neural network to determine, for a given font, the probability that each font tag in a set of font tags corresponds to the given font. The font retrieval system can then identify and provides, for a given font, the font tag probabilities for the font tags in a multi font-tag query to a tag-based font retrieval neural network. The tag-based font retrieval neural network can then generate a font affinity score based on the font tag probabilities for the font tags in the multi font-tag query for the given font. In many embodiments, the font affinity score indicates how closely the given font corresponds to the font tags in the multi font-tag query. As described in greater detail below, the font retrieval system can train a tag-based font retrieval neural network to generate comprehensive affinity scores that equally consider all of the font tags in a query, and thus, are not biased toward more popular font tags in a corpus used to train the neural networks. The font retrieval system can repeat the above processes to generate affinity scores for each font in queried database relative to the multi font-tag query. The font retrieval system can then identify one or more fonts with high or the highest affinity scores and returns the identified fonts in response to the multi font-tag query.

To train the neural networks, in one or more embodiments, the tag-based font retrieval system (or simply "font retrieval system") obtains a set of font images, where each image is associated with a ground-truth list of font tags. Utilizing the font images and corresponding ground truth font tags, the font retrieval system can train the font tag recognition neural network to determine font tag probabilities for each font image. In particular embodiments, the font retrieval system trains the font tag recognition neural network to determine a probability that each font tag corresponds to an input font in an input font image.

In additional embodiments, the font retrieval system trains a font tag retrieval neural network to generate font affinity scores indicating how closely a font corresponds with a list of input font tags. More specifically, to train the font tag retrieval neural network, the font retrieval system can select corresponding pairs of font tag lists and font images. For instance, the font retrieval system sets a positive pair as font image and a complete ground truth tag list as well as sets a negative pair as a font image and a tag list that does not include a complete ground truth tag list (e.g., some but not all of the ground truth tag list or none of the ground truth tag list). The font retrieval system can then utilize a pairwise loss function to tune the parameters of the tag-based font retrieval neural network. The pairwise training teaches the tag-based font retrieval neural network to consider all of the tags in a multi font-tag query when generating an affinity score and not to overweight popular tags.

Thus, the font retrieval system can train multiple deep learning neural networks. In one or more embodiments, the font retrieval system initially trains the font tag recognition neural network. For example, the font retrieval system generates a convolutional neural network (CNN) that includes convolutional layers and fully-connected layers. Alternatively, the font retrieval system can utilize a pre-trained font tag recognition neural network.

Additionally, the font retrieval system can train the tag-based font retrieval neural network, which includes fully-connected layers. In various embodiments, the fully-connected layers of the font retrieval neural network include a first fully-connected layer having a power activation function and a second fully-connected layer having a sigmoid activation function, which maps output from the first fully-connected layer to a predetermined range (e.g., 0-1).

In additional embodiments, the font retrieval system sequentially trains and/or jointly trains the font tag recognition neural network and the tag-based font retrieval neural network. For example, the font retrieval system first trains the font tag recognition neural network based on font images and corresponding font tags. Next, the font retrieval system can train the font tag recognition neural network based on a pairwise loss function that employs a positive/negative pairing of corresponding font images and corresponding/ non-corresponding font tags (where the font images are first fed through the font tag recognition neural network).

In some embodiments, the font retrieval system then jointly trains the font tag recognition neural network and the tag-based font retrieval neural network using a second pairwise loss function based on a positive/negative pairing of corresponding font tags and corresponding/non-corresponding font images. In each case, the font retrieval system can back-propagate error loss to parts of the corresponding neural networks until the error loss is minimized and/or the networks converge.

As mentioned above, once trained, the font retrieval system can utilize the tag-based font retrieval neural network to retrieve fonts in response to font tag queries. For example, a user provides a list of font tags (e.g., labels that describes a font) as part of a multi font-tag query. In response, the font retrieval system feeds the font tags into the trained font retrieval neural network, which generates font affinity scores indicating the probability that each font in the font set corresponds to all of the inputted font tags. Utilizing the font affinity scores, the font retrieval system can provide, in response to the query, one or more fonts to the user that accurately align with the font tags included in the query.

As mentioned above, the recent increase in the number of digital fonts has brought forth a number of challenges, particularly in the field of digital font retrieval. To illustrate, a significant challenge that has arisen with the increase in the number of digital fonts is the capability to efficiently find a desired font or font style. One type of font retrieval is tag-based font retrieval in which a user provides a query term to search for corresponding fonts. A number of problems have made developing a tag-based font search system challenging. Indeed, font tags are subjective and non-standardized. Additionally, the number of potential font tags is unlimited. Further, a font tag can describe different categories of a font, such as the font's visual appearance, characteristics, usage, classification, family, mood, special properties, and/or other attribute categories. Accordingly, the vastness of a font tag library creates difficulty in training a tag-based font search system. Indeed, a large number of font tags can lead to misclassification and inaccurate results. Further, this problem is exacerbated as new fonts, with or without font tags, are constantly being created.

As just mentioned, font tags are subjective to users creating them. The importance and informativeness of tags may vary from user to user. In addition, there is also a large gap between the semantics of natural language in a font tag and the visual appearance of the font. Further, the tag description from a user can sometimes be ambiguous and vague. Also, different users may choose vastly different tags when describing fonts of similar visual appearance in their minds. For example, different users can use the same tag to describe different looking fonts. Similarly, different users can use unrelated tags to describe the same font. Thus, relying on user tags alone leads to inconsistent and unreliable results.

Because of these issues, attempts by conventional systems to create tag-based font conventional search systems have been unsuccessful and resulted in unsatisfactory systems. For instance, these conventional tag-based font search systems necessitate large amounts of memory and computational requirements. Furthermore, conventional tag-based font search systems are inaccurate due to training employing user tags. Inaccuracies further increase when these conventional systems attempt to retrieve fonts based on multiple font tags. Indeed, conventional tag-based font search systems often return results relating to only the font label that appears most frequently in the training data (e.g., a font tag domination problem). Additionally, conventional tag-based font search systems typically have relatively small numbers of tags and fonts, meaning the systems are limited and inflexible. Accordingly, these and other problems exist with regard to retrieving digital fonts utilizing a tag-based font search system using existing systems and methods.

As previously mentioned, the font retrieval system provides numerous advantages and benefits over conventional systems and methods. In general, the font retrieval system utilizes deep learning neural networks to learn, predict, and retrieve fonts based on font tag queries including multiple font tag queries. Indeed, the font retrieval system combines multiple neural networks to improve the accuracy of tag-based font retrieval.

More specifically, in many embodiments, the font retrieval system efficiently analyzes heterogeneous (e.g., non-standardized, subjective, vague, and/or ambiguous) font tags and generates uniform font-tag prediction representations, which are utilized to retrieve fonts matching a font tag query. Indeed, the font retrieval system learns objective, well-defined, and precise metrics between font images (e.g., visual features) and font tags through combining a font tag recognition neural network with a font retrieval neural network. Further, as new fonts are created, the font retrieval system can automatically and accurately learn correspondences between these new fonts and any number of font tags.

Because the font retrieval system efficiently processes non-standardized font tags, the font retrieval system provides increased flexibility over conventional systems. Indeed, the ability of the font retrieval system to efficiently treat non-standardized font tags enables the font retrieval system to operate across different font tag categories (e.g., the font's visual appearance, characteristics, usage, classification, family, mood, special properties, and/or other attribute categories).

Additionally, the font retrieval system significantly improves accuracy when retrieving fonts based on font tag queries. Unlike conventional systems that often return results relating to only the font label that appears most frequently in training data (e.g., the font tag domination problem), the font retrieval system provides balanced and comprehensive font results that represent each of the font tags included in a font tag query. By utilizing the font retrieval neural network on top of the font tag recognition neural network, the font retrieval system learns to achieve a balance among the different weighted font tags in a query and solve the font tag domination problem. Indeed, the font retrieval system identifies and retrieves balanced results even when the dataset used to train the font retrieval system are imbalanced or biased.

The font retrieval system also improves computer efficiency. For instance, by more accurately and precisely identifying relationships between font images, font tags, and fonts, the font retrieval system can reduce computing resources required to generate, predict, and retrieve fonts in response to font tag queries. Additionally, as described below in connection with FIG. 7B, researchers compared embodiments of the font retrieval system to baseline font retrieval models and found that the font retrieval system disclosed herein outperforms these baseline models.

Additional advantages and benefits of the font retrieval system will become apparent in view of the following description. Further, as illustrated by the foregoing discussion, the present disclosure utilizes a variety of terms to describe features and advantages of the font retrieval system. For example, as used herein, the term "digital font" (or simply "font") refers to a defined set of digital characters (e.g., glyphs). In particular, the term "font" includes a collection of digital characters of a particular style or typeface. A font includes digital files with the extensions, such as, but not limited to: .ttf, .otf, .fnt, .abf, .ttc, .suit, .woff, .vnf, .t65, .sfp, .sad, .pmt, .pfm, .pfb, .pfa, .odtff, .mf, .gdr, .fon, .fnt, .font, .etx, .eot, .compositefont, .acfm, .afm, or .amfm. For example, the term digital font includes fonts entitled Times New Roman, Helvetica, Arial, PT Sans Regular, Corbel, or other font titles.

As used herein, the term "font image" refers to any type of electronic document, image, or file that includes written text (i.e., glyph content) in a font. For example, a font image can include an electronic document in the form of an image file (permanent or temporary), a clipboard file, a word-processing document, a portable document file (PDF), an e-mail file, a text file, a web page, or any other electronic file. The font retrieval system can utilize font images to train one or more neural network (e.g., font training images). In addition, a font image can be associated with metadata, such as fonts (e.g., font names), font tags, and/or font classifications that provide information about the font used in the font image.

The term "font tag," as used herein, refers to a label that describes a characteristic or attribute associated with the font. In particular, the term "font tag" can describe the look, style, or feel of a font. In some embodiments, font tags are divided into categories, such as visual appearance, characteristics (e.g. thin, block, modern, antique, crazy), usage or utility (e.g. headline, poster, magazine, logo), family, mood, special properties, and/or other attribute categories (e.g., ornamental, kid, ancient). Additionally, a font tag can also indicate attributes corresponding to a font, such as style (e.g., regular, bold, italic, shadowed, underlined, strikethrough, hand-written, display, subscript, or superscript), weights (e.g., light, regular, and heavy weights), widths (e.g., condensed, regular, and extended widths), capitalization styles (e.g., all caps, small caps, title case, and sentence case), x-heights (e.g., small, regular and large x-heights), and contrasts (e.g., low, regular, and high contrasts).

Similarly, the term "font classification" refers to a font family, category, and/or font name and can include pre-defined categories utilized to classify digital fonts. For instance, font classifications include font classes (i.e., Serif, Sans Serif, Slab Serif, Script, Blackletter, Mono, Hand, or Decorative). In some embodiments, a font tag and a font classification include overlapping labels or information. For example, a font tag category can include font classifications.

As mentioned above, the font retrieval system utilizes machine learning and various neural networks in various embodiments. The term "machine learning," as used herein, refers to the process of constructing and implementing algorithms that can learn from and make predictions on data. In general, machine learning may operate by building models from example inputs, such as a training set of font images corresponding to a plurality of fonts, to make data-driven predictions or decisions. Machine learning can include one or more neural networks and/or machine-learning models (e.g., the font tag recognition neural network, the font retrieval neural network, a font tag attention model, a generative adversarial network ("GAN") having a generator neural network and a discriminator neural network).

As used herein, the term "neural network" refers to a machine learning model that can be tuned (e.g., trained)

based on inputs to approximate unknown functions. In particular, the term neural network can include a model of interconnected neurons that communicate and learn to approximate complex functions and generate outputs based on a plurality of inputs provided to the model. For instance, the term neural network includes an algorithm (or set of algorithms) that implements deep learning techniques that utilize a set of algorithms to model high-level abstractions in data using supervisory data to tune parameters of the neural network.

In addition, in one or more embodiments, the term neural network can include deep convolutional neural networks (i.e., "CNNs") or other types of deep neural networks. The description and figures below generally refer to a CNN, which includes lower layers (e.g., convolutional, deconvolutional, and pooling layers), higher layers (e.g., fully-connected layers and classifiers). Example architecture of a CNN is provided in FIG. 2B.

In some embodiments, a neural network includes fully-connected layers. To illustrate, in one or more embodiments, the font retrieval neural network includes at least two fully-connected layers. For example, the first fully-connected layer of the font retrieval neural network includes a power activation function. Further, the second fully-connected layer of the font retrieval neural network includes a sigmoid activation function that maps output from the first fully-connected layer to a predetermined range. Additional detail regarding the font retrieval neural network is provided in FIG. 2A.

During training, a neural network can also utilize loss layers having loss models. Alternatively, the loss model may be separate from a neural network. A loss model may include a loss function. As used herein, the term "loss function" or "loss model" refers to a function that indicates error loss between feature vectors and/or probability vectors in multi-dimensional vector space. A machine-learning algorithm (e.g., neural network) can repetitively train to minimize and/or maximize font error loss (e.g., font classification error loss or tag-based font error loss) based on ground truths (e.g., font classifications or font tags) and/or pairwise loss. Indeed, the loss function provides feedback, which is back-propagated, to one or more layers of a neural network to tune/fine-tune those layers. Examples of loss functions include a sigmoid unit function, a pairwise loss function, a softmax classifier with cross-entropy loss, a residual loss function, a perceptual loss function, a total variance loss function, a texture loss function, a hinge loss function, a least squares loss function, or a combination thereof.

As used herein, joint training (or joint learning) refers to tuning parameters of multiple learning models together. In particular, joint training (or learning) includes solving a plurality of learning tasks at the same time while utilizing the roles and constraints across the tasks. For example, the font retrieval system can employ joint learning to iteratively and/or simultaneously train and tune weights and parameters of the various neural networks and/or machine-learning models. In some embodiments, joint training includes alternating training back and forth between the font tag recognition neural network and the font retrieval neural network and/or changing the learning rates, as described further below.

As mentioned above, the font retrieval system generates font feature vectors such as a font tag recognition feature vector. As used herein, the term "font feature vector" (or simply "feature vector") refers to a vector of numeric values representing characteristics and/or attributes of a font learned by a machine-learning algorithm such as a neural network. In particular, the term "font feature vector" includes a set of values corresponding to latent and/or patent attributes and characteristics of a font. In one or more embodiments, a feature vector is a multi-dimensional dataset that represents a font.

In addition, the font retrieval system utilizes the font tag recognition neural network to generate tag-based font tag probability vectors. The term "font tag probability vector" or "tag probability vector" refers to a set of values that provide a correlation between font tags and known fonts. In particular, the term "font tag probability vector" includes an n-dimensional vector where n corresponds to a number of known font tags. For each of the n font tags, the font tag probability vector includes a corresponding probability that the font tags match a given font. In some cases, a font tag recognition neural network generates a font tag probability vector for each input font image, as described below. Further, the font retrieval neural network can receive a font tag probability vector. For example, the font retrieval system provides font tag probability vectors as input to the font tag recognition neural network.

As mentioned above, in various embodiments, the font retrieval neural network generates font affinity scores. As used herein, the term "comprehensive font affinity scores" (or simply "font affinity scores") refer to a correlation between a font and tags in a font tag query. More particularly, a font affinity score for a given font indicates a connection strength (e.g., similarity) between the given font and one or more font tags in a query. In many embodiments, a higher affinity score indicates a stronger relationship between a font and the font tags in a query. In one or more embodiments, the font affinity score is mapped to the range of 0-1. In some embodiments, the font retrieval system generates and averages a font affinity score based on multiple samples (e.g., font images) of a font.

Referring now to the figures, FIG. 1 illustrates an example general process for training and utilizing tag-based font neural networks in accordance with one or more embodiments. In particular, FIG. 1 illustrates a series of acts 100. In one or more embodiments, the font retrieval system implements the series of acts 100. The font retrieval system can be implemented by one or more computing devices, such as one or more server devices, one or more client devices, or a combination of server devices and client devices.

As shown in FIG. 1, the font retrieval system trains 102 a font tag recognition neural network to predict font tag probabilities. In various embodiments, the font retrieval system utilizes a font training set that includes font images (e.g., input font images), font labels (e.g., font tags). For example, the font retrieval system utilizes the font tags as a ground-truth to tune the font tag recognition neural network to learn which font images correspond to which font tags. Indeed, the font tag recognition neural network generates font tag probabilities for each input font image that indicates the probability that each font tag correlates to the font rendered in the input font image. Additional detail regarding initially training the font tag recognition neural network is provided below with respect to FIG. 2A.

FIG. 1 also illustrates the font retrieval system generating 104 filtered tag probabilities based on the font tag probabilities and applicable font tags. For example, in one or more embodiments, the font retrieval system generates filtered tag probabilities by combining the font tag probabilities determined for an input font image with the font tags that correspond to the font image. In some embodiments, the font retrieval system vectorizes the font tags using binary encode and/or elementwise multiplication to generate the filtered tag probabilities. In other words, a filtered font tag probability vector includes probabilities for font tags that are applicable (e.g., probabilities for the tags that are the ground truth labels for a training or input image, or in the case of runtime, the probabilities for font tags in a multi font-tag query). Additional detail regarding generating filtered tag probabilities is provided below with respect to FIG. 2A.

As shown, the font retrieval system trains 106 a font retrieval neural network to generate font affinity scores based on the filtered tag probabilities. For instance, in various embodiments, the font retrieval system feeds the filtered tag probabilities through fully-connected layers of the font tag recognition neural network to generate comprehensive font affinity scores. The font retrieval system trains the tag-based font retrieval neural network using positive and negative pairs of font images and font tags. The font retrieval system sets a positive pair as font image and ground truth tag list that includes all of the input tags. The font retrieval systems set a negative pair as a font image and a tag list that does not include all of the input tags. The font retrieval system then uses a pairwise loss function to tune the parameters of the tag-based font retrieval neural network. The pairwise training teaches the tag-based font retrieval neural network to consider all of the tags in a multi font-tag query when generating an affinity score and not to over-weigh popular tags. Additional detail regarding initially training the font tag recognition neural network is provided below with respect to FIG. 2A.

FIG. 1 also illustrates the font retrieval system providing 108 a font recommendation utilizing the trained tag-based font retrieval neural network in response to a font tag query. In one or more embodiments, the font retrieval system receives one or more font tags in a query and obtains filtered tag probabilities, which are then fed into the trained font retrieval neural network. In response, the trained font retrieval neural network generates font affinity scores (i.e., comprehensive font affinity scores) corresponding to the font tags. Then, utilizing the font affinity scores, the font retrieval system can retrieve and recommend the top fonts in the set of fonts that best correlate to the inputted font tags. Additional detail regarding retrieving fonts based on font tags is provided below with respect to FIG. 4. Further, example of retrieved fonts based on one or more font tags are provided below in connection with FIGS. 7A-7B.

As mentioned above, the font retrieval system achieves significantly more accurate results than conventional systems. In particular, the font retrieval system determines a comprehensive and balanced approach to retrieving fonts based on font tags in a font query. Indeed, unlike some conventional systems that sum together font tag probabilities when encountering multiple font tags in a query, which leads to the more popular font in a font tag list swallowing up the other fonts in the font tag list (i.e., the font tag domination problem), the font retrieval system trains the font retrieval neural network to fairly balance all font tags in a query when retrieving a font.

Figure 2A:
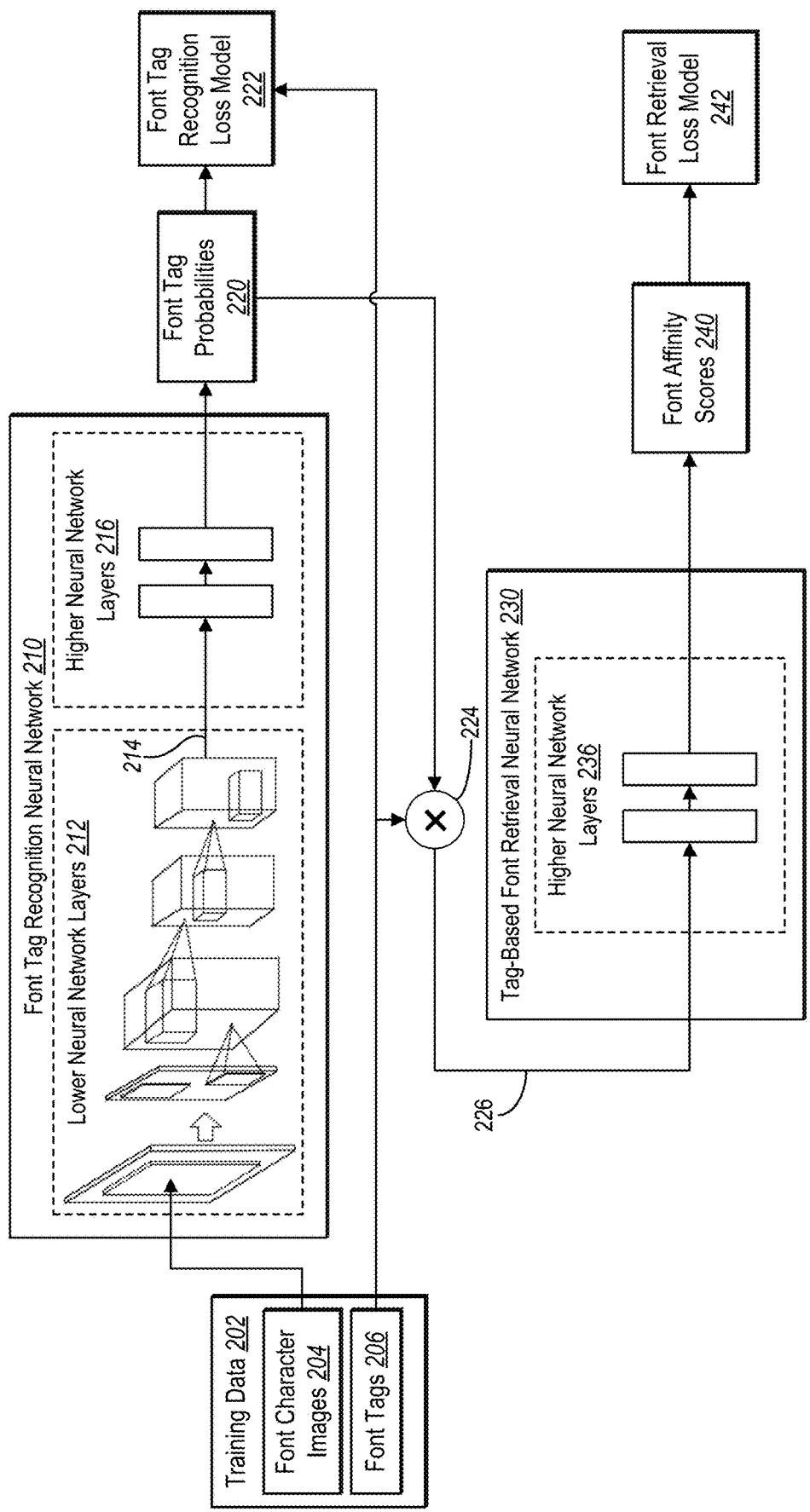
FIGS. 2A-2B illustrate diagrams of training a font tag recognition neural network and a tag-based font retrieval neural network in accordance with one or more embodiments.

As mentioned above, FIGS. 2A-2B illustrate diagrams of a more detailed process for training the combined tag-based neural networks. In particular, FIG. 2A shows training a font tag recognition neural network 210 and a tag-based font retrieval neural network 230 (or simply "font retrieval neural network 230"). As described below, the font retrieval system can train the two neural networks separately as well as jointly. Additionally, FIG. 2C illustrates an example architecture of the font tag recognition neural network 210.

As shown in FIG. 2A, the font retrieval system utilizes training data 202 to train both the font tag recognition neural network 210 and the font retrieval neural network 230. The training data 202 includes font character images 204 of fonts as well as font tags 206. For example, the font tags 206 include ground truth font tags associated with each font.

In various embodiments, the font retrieval system pre-processes the training data 202 to ensure conformity across the data. In particular, the font retrieval system pre-processes font names, tags, and classifications. To illustrate, in one or more embodiments, for each font tag, the font retrieval system changes all characters in a tag to lowercase, lemmatizes each word (e.g., removes plurals) in a tag, connects multi-word tags with hyphens (e.g., "sans serif" to "sans-serif"), and/or combines duplicate tags. In additional embodiments, the font retrieval system can also filter out tags, such as any tag that appears less than ten times in the training data 202.

Before describing how the font retrieval system trains each of the font neural networks, additional detail is provided regarding generating or obtaining the training data 202. In various embodiments, the font retrieval system obtains a set of fonts from one or more sources. For example, the font retrieval system obtains fonts from one or more font repositories. As part of obtaining fonts, the font retrieval system can also obtain font tags and font classifications corresponding to the fonts. In some instances, the font tags and/or classifications are provided by user input, such as by the creator of the font or by a font curator. In other instances, the tags and/or classifications are automatically generated.

In one or more embodiments, upon obtaining the set of fonts, the font retrieval system can generate the training data 202. To illustrate, in one or more embodiments, the font retrieval system generates a font character image by selecting a font, renders a number (e.g., five) of random characters (e.g., glyphs including uppercase and/or lowercase) written in the selected font, and captures/renders an image of the font characters. In alternative embodiments, the font retrieval system generates font character images that include all of the glyphs of a font (e.g., uppercase, lowercase, number, symbols, etc.), which can reduce or eliminate visual biases during font tag recognition. In addition, the font retrieval system can associate one or more font tags and a font classification with the font character image.

In various embodiments, the font retrieval system can generate a number of sets of font character images 204 along with corresponding font tags 206 for each font in the font set. For instance, the font retrieval system renders millions of font character images 204 paired with font tags 206. In one or more embodiments, the font retrieval system allocates portions of the generated training data for testing (e.g., 10%) and validation (e.g., 10%) in addition to the training portion (e.g., 80%). In further embodiments, as described below with respect to FIGS. 3A-3B, the font retrieval system can also generate positive and negative font image/tag pairs to train the neural networks.

In additional embodiments, or in the alternative, the font retrieval system can obtain the training data 202 from a third-party source. For example, the font retrieval system previously created a training font set of text images, which is stored in a font database, either locally or remotely. In another example, the font retrieval system obtains a training font set from a third-party, such as an online font library or repository. Moreover, the font retrieval system can combine one or more training font sets with newly rendered text images.

In various embodiments, the font retrieval system randomly introduces deviations into the font character images

204. For example, the font retrieval system randomly introduces noise (e.g., a small Gaussian noise with zero mean and a standard deviation of three), blur (e.g., a random Gaussian blur with standard deviation between two and four), perspective rotation (e.g., a randomly-parameterized affine transformation), and/or shading (e.g., random gradients that fill the input background) into some of the font character images 204. In addition, the font retrieval system can add variable character spacing and/or variable aspect ratio modifications to the font character images 204. These deviations add robustness while training each font neural network as well as enable a trained font tag recognition neural network recognition neural network to better recognize and characters real-world font character images that are later added to be associated with font tags (e.g., offline training).

Turning now to training the font tag recognition neural network 210, in various embodiments, the font tag recognition neural network 210 is a convolutional neural network (CNN). In some embodiments, the font tag recognition neural network is a deep learning convolutional neural network. In alternative embodiments, the font tag recognition neural network 210 is a different type of neural network.

As shown, the font tag recognition neural network includes lower neural network layers 212 and higher neural network layers 216. In general, the lower neural network layers 212 are collectively called an encoder and the higher neural network layers 216 are collectively called a decoder or classifier (e.g., a font tag classifier). In one or more embodiments, the lower neural network layers 212 are convolutional layers that encode font character images 204 into hidden encoded features represented as font tag recognition feature vectors 214 (or simply "feature vectors 214").

As just mentioned, the lower neural network layers 212 generate feature vectors 214 from input font character images 204. In various embodiments, the feature vectors 214 are n-dimensional vectors represented in n-dimensional space (i.e., vector space), where n corresponds to the number of font tags included in the collection of font tags 206 from the training data 202. For example, if the training data 202 included 2,000 font tags, the feature vectors 214 would be a 2,000-dimensional vector. Each dimensional in a feature vector provides hidden or latent representations between the font in the font character image and the font tags within a font tag feature/vector space.

The higher neural network layers 216 can comprise fully-connected layers that classify the feature vectors 214 and output font tag probabilities 220 (e.g., a font tag probability vector). In various embodiments, the font retrieval system compares the generated feature vector 214 to known tag feature vectors learned via training to generates a font tag probability vector (e.g., font tag probabilities), which indicates a correspondence between the input font character image and each font tag.

In some embodiments, the higher neural network layers 216 include a sigmoid function that classifies the probability (e.g., from [0-1]) that each font tag corresponds to a font character image being used to train the font tag recognition neural network 210. Indeed, the font retrieval system utilizes the sigmoid function to classify the font tag probabilities 220 as the font tag recognition neural network 210 is designed as a multi-label learning task network to enable multiple tags to be assigned to each font. Overall, the font tag recognition neural network 210 extracts deep font visual features (e.g., line types, thickness, smoothness, curvature, height, width) and predicts font tag probabilities based on these visual features and other hidden features.

During training, the font retrieval system can employ a loss layers model to tune the font tag recognition neural network 210. As shown, the font retrieval system utilizes a font tag recognition loss model 222 to train the font tag recognition neural network 210. Described at a high level, the font retrieval system utilizes the font tag recognition loss model 222 to provide feedback based on the accuracy of the font tag predictions. For example, the font retrieval system utilizes the font tag recognition loss model 222 to determine an amount of font tag prediction error between the font tag probabilities 220 predicted by the font tag recognition neural network 210 and the font tags 206. Then, utilizing the error amount, the font retrieval system updates the tunable weights parameters of the various layers of the font tag recognition neural network 210 in train epochs until the error amount is minimized.

To illustrate, in various embodiments, the font retrieval system provides the font tag probabilities 220 (i.e., a font tag probability vector) to the font tag recognition loss model 222. Additionally, the font retrieval system provides the ground truth font tags 206 from the training data 202 corresponding to an input font image to the font tag recognition loss model 222. In this manner, the font tag recognition loss model 222 can utilize the font tags 206 as a ground-truth to evaluate the accuracy of the font tag probability vectors generated by the font tag recognition neural network 210.

Next, the font tag recognition loss model 222 compares the font tag probabilities 220 to the font tags 206 to determine an amount of font tag recognition error loss (or simply "tag error loss"). In various embodiments, the font tag recognition loss model 222 employs cross-entropy loss, and/or mean square error computations, or another type of loss formulation to determine the amount of tag error loss. Further, the font retrieval system can utilize the tag error loss to train and optimize the neural network layers of the font tag recognition neural network 210 via back-propagation and end-to-end learning. Indeed, in various embodiments, the font retrieval system back-propagates the tag error loss to tune tag recognition feature parameters within layers of the font tag recognition neural network 210. For instance, in one or more embodiments, the font retrieval system takes the tag error loss output from the font tag recognition loss model 222 and provides it back to the lower neural network layers 212 and/or the higher neural network layers 216 until the tag error loss is minimized utilizing an Adam optimizer or other back propagation technique. In particular, the font tag recognition loss model 222 provides feedback to the lower neural network layers 212 to further tune the font feature extraction parameters and/or the higher neural network layers 216 to further tune the font tag recognition parameters. As the tag error loss reduces, the accuracy of the font tag probabilities 220 improves.

Equation 1, shown below, provides an example formulation of training the font tag recognition neural network 210 with cross-entropy loss. By way of context for Equation 1, given the training font set $\{F_1, \ldots, F_M\}$ and character set $\{C_1, \ldots, C_{52}\}$ for an input glyph image $I_i$ that includes character $L_j$ of font $F_i$, the font tag recognition neural network 210 first extracts a hidden feature $f'_i$ by a CNN. The hidden feature is then fed into a fully-connected layer with N output nodes, where N represents the total tag vocabulary size. Next, a sigmoid unit maps the value of each node in the range of [0-1], which represents the image's probability to match each specific tag. The font retrieval system then utilizes cross-entropy loss to train the font tag recognition neural network 210 using the following recognition loss equation:

$$L_{rec} = \sum_{i,j} \sum_{k=1}^{N} \left( y_i^k \log(p_i^{j,k}) + (1 - y_i^k) \log(1 - p_i^{j,k}) \right) \quad (1)$$

As shown in Equation 1, $p_i^{j,k}$ represents the predicted probability for $I_i^j$ to match the kth tags. Also, in Equation 1 above, 1 if $F_i$ is labeled at the kth tag, otherwise $y_i^k$ is 0.

Once the font tag recognition neural network 210 is trained, the font retrieval system can provide the font tag probabilities 220 to the font retrieval neural network 230 (i.e., tag-based font retrieval neural network 230), which generates font affinity scores. For example, the font retrieval system trains the font retrieval neural network 230 using the font tag probabilities 220 as input. Before the font retrieval system provides the font tag probabilities 220 to the font retrieval neural network 230, the font retrieval system applies font tags 206 to the font tag probabilities 220 to filter out font probabilities that are not applicable to a given training set.

To illustrate, as shown in FIG. 2A, the font retrieval system applies the font tag probabilities 220 to the font tags 206 at a filter 224. In various embodiments, the filter 224 converts the font tags 206 into a vector. For example, in some instances, the font retrieval system employs binary encoding (e.g., one-hot encoding) to vectorize the font tags 206. To illustrate, the font retrieval system creates a vector that is n-entries long where n represents the number of total font tags and defaults each entry to 0 (i.e., zero). For each list of font tags 206, the font retrieval system updates the entry corresponding to each font tag in the list to 1 (i.e., one). In this manner the filtered tag probabilities comprise the tag probabilities applicable to a given font and corresponding ground truth font tags. As shown in FIG. 2A, the filter 224 generates filtered tag probabilities 226 (i.e., a font tag probability vector).

As mentioned above, the font retrieval system also trains the font retrieval neural network 230. As shown, the font retrieval neural network 230 includes higher neural network layers 236. In various embodiments, the higher neural network layers 236 include at least two fully-connected layers. For example, in some embodiments, the first fully-connected layer includes a power activation function that outputs raw font affinity scores based on the inputted filtered tag probabilities 226. In particular, the font retrieval neural network 230 maps each font tag probability (e.g., each node in the font tag probability vector) with the power activation function. An example of a power activation function is shown in Equation 2 below:

$$x \rightarrow (\text{ReLU}(x) + \varepsilon)^{\alpha} \quad (2)$$

As shown in Equation 2, $\alpha$ represents an adjustable hyper-parameter and $\varepsilon$ is used to prevent infinite gradient. In alternative embodiments, the first fully-connected layer includes a common rectified linear unit (ReLU), sigmoid, tan h, or another activation function rather than a power activation function. In additional embodiments, the second fully-connected layer includes a sigmoid activation function that maps the output from the first fully-connected layer to a predetermined range (e.g., 0-1). For instance, the second fully-connected layer converts the raw font affinity scores into normalized font affinity scores.

To illustrate, the font retrieval system feeds the filtered tag probabilities 226 into the font retrieval neural network 230. The font retrieval neural network 230 converts the probability scores into font affinity scores 240, as shown in FIG. 2A. The font affinity scores 240 indicates a connection strength (e.g., similarity) between the initial font character image 204 feed into the font tag recognition neural network 210 and the corresponding font tag 206. In this manner, the font affinity scores incorporate multiple attributes of a given font as they correspond to every ground truth font tag associated with the font. Indeed, the font affinity scores provide a comprehensive and balanced representation of multiple font tags.

In some embodiments, the font retrieval system generates the font affinity scores for a given font based on at least five randomly selected font character images 204 (and the same list of ground truth font tags 206) of the given font to reduce visual biases. In alternative embodiments, the font retrieval system generates the font affinity scores for a given font based on font character images 204 that include all the glyphs of the font in the font character images 204 of the training data 202 to eliminate visual biases.

As additional detail regarding training the font retrieval neural network 230, the font retrieval system adds the font retrieval neural network 230 on top of the font tag recognition neural network 210 and transforms font tag probabilities 220 from a font character image 204 into a comprehensive affinity score 240 towards a list of ground truth font tags 206, which fairly considers each font tag (and multiple font tags in a query). Indeed, given an input pair of image $I_i^j$ as query q, the font retrieval system first predicts the font tag probability distribution of $I_i^j$ as $p_i^j$ from the set of $\mathbb{R}^N$. Next, the query q is transformed into a binary vector $v_q$ from the set of $\mathbb{R}^N$. Further, the tth node of $v_q$ is set to 1 if the query q contains the tth font tags. Moreover, the font retrieval system executes elementwise multiplication between image $I_i^j$ and binary vector $v_q$ to generate a font tag-weighted tag probability vector (e.g., filtered tag probabilities 226). The font retrieval system inputs the font tag-weighted tag probability vector into the font retrieval neural network 230 to generate the font affinity score 240 of image $I_i^j$ and query q. In some embodiments, the font retrieval system applies a power activation function applied to each node (i.e., n) in the font tag probability vector using the formulation $n=n^x$, where x is set to a constant such as 0.1.

As shown, the font retrieval system can train the font retrieval neural network 230 utilizing a loss model. More specifically, the font retrieval system can train the font retrieval neural network 230 using a pairwise loss model 242. In various embodiments, pairwise loss training includes providing a training pair (i.e., a positive and negative training pair) to the font retrieval neural network 230. As described in detail below with respect to FIG. 3A, the font retrieval system generates a positive pair that includes an image of a first font (randomly selected) and a corresponding list of font tags (e.g., a complete list of ground truth font tags). Further, the font retrieval system generates a negative pair that includes an image of a second font (also randomly selected) and a non-corresponding list of font tags (e.g., a non-complete list of ground truth font tags). In one or more implementations the corresponding list of font tags of the positive pair is the same as the non-corresponding list of font tags of the negative pair.

To train the font retrieval neural network 230, the font retrieval system first feeds the positive pair and the negative pair to the font tag recognition neural network 210 to generate font tag probability vectors 220. Next, the font retrieval system combines the font tag probability vectors with their respective font tags to generate filtered tag probability vectors 226, which are feed to the font retrieval neural network 230. Further, the pairwise loss model 242 compares the difference between the positive pair and the negative pair. More particularly, the font retrieval system verifies that the retrieval error loss for the negative pair is greater than the retrieval error loss for the positive pair. When the positive pair has a smaller amount of retrieval error loss, the positive pair will achieve a higher font affinity scores than the negative pair.

Notably, in many embodiments, when training the font retrieval neural network 230, the font retrieval system fixes the parameters of the font tag recognition neural network 210. In this manner, the font retrieval system employs a soft pairwise loss function. Indeed, the font retrieval system utilizes the difference in retrieval error loss between the positive pair and the negative pair to tune the parameters of the font retrieval neural network 230.

Equation 3 below provides an example pairwise loss function to train the font retrieval neural network 230:

$$L_{ret} = \sum_{pos,neg \in Q} \log(1 + e^{(\gamma*(Score_{neg} - Score_{pos}))}) \quad (3)$$

As shown in Equation 3, Q represents all possible combinations of a positive pair and a negative pair in a batch of training pairs. $Score_{neg}$ and $Score_{pos}$ represent the predicted affinity scores of a positive pair (e.g., "pos") and a corresponding negative pair (e.g., "neg"). In addition, γ represents a hyper-parameter that controls the penalty degree. When training the font retrieval neural network 230, the font retrieval system can fix the parameters of the font tag recognition neural network 210. Also, as explained above, the font retrieval system can utilize pairwise loss training to ensure that the font retrieval neural network 230 provides comprehensive and balanced font affinity scores that fairly represent all font tags in a list of font tags (or provided in a font tag query).

Further, the font retrieval system can further train the font tag recognition neural network 210. Similar to training the font retrieval neural network 230, the font retrieval system can employ a pairwise loss function to further train the font tag recognition neural network 210. To illustrate, in various embodiments, the font retrieval system generates new training pairs. For example, as described in detail below with respect to FIG. 3B, the font retrieval system generates a positive pair that includes an image of a first font (randomly selected) with a corresponding list of font tags. Additionally, the font retrieval system generates a negative pair that includes an image of the same first font with a non-corresponding list of font tags. After generating the training pairs, the font retrieval system feeds the training pairs through the font tag recognition neural network 210, as described previously.

Equation 4 below provides an example pairwise loss function to further train the font tag recognition neural network 210:

$$L_{rec2} = \sum_{pos_{tag}, neg_{tag}} \log(1 + e^{(P_{neg_{tag}} - P_{pos_{tag}})}) \quad (4)$$

As shown, Equation 4 represents a tag-level soft pairwise loss function. In particular, in Equation 4, for a given font character image, $pos_{tag}$ represents a font tag associated with the font character image (e.g., randomly selected from the list of corresponding font tags) and $neg_{tag}$ represents a randomly selected font tag not associated with the font (e.g., not included in the list of corresponding font tags). In addition, $P_{postag}$ and $P_{negtag}$ represent the probability of $pos_{tag}$ and $neg_{tag}$ predicted by the font tag recognition neural network 210. In some embodiments, the font retrieval system trains the font tag recognition neural network 210 using 500 training pairs of $pos_{tag}$ and $neg_{tag}$.

In some embodiments, after training both the font tag recognition neural network 210 and the font retrieval neural network 230, the font retrieval system can further fine tune the neural networks through joint training. While not necessary, joint training can further improve the accuracy of the font retrieval system by fine-tuning both the font tag recognition neural network 210 and the font retrieval neural network 230.

In various embodiments, the font retrieval system follows the formulation provided in Equation 5 below to jointly train the tag-based neural networks:

$$L_{total} = (\alpha * L_{ret}) + (\beta * L_{rec2}) \quad (5)$$

As shown, Equation 5 generates the total loss between Equation 3 plus Equation 4, where each of the equations is first weighted by a weighting factor (i.e., α and β). Stated differently, the font retrieval system can jointly train the combined tag-based neural networks to minimize total error loss across both the font tag recognition neural network 210 and the font retrieval neural network 230. Indeed, as shown in Equation 5 and as described above with respect to Equation 3 and Equation 4, the font retrieval system can employ pairwise loss functions to minimize total error loss as part of fine-tuning the combined tag-based neural networks. In alternative embodiments, the font retrieval system can employ other loss functions to fine-tune one or both of the combined tag-based neural networks.

Figure 2B:
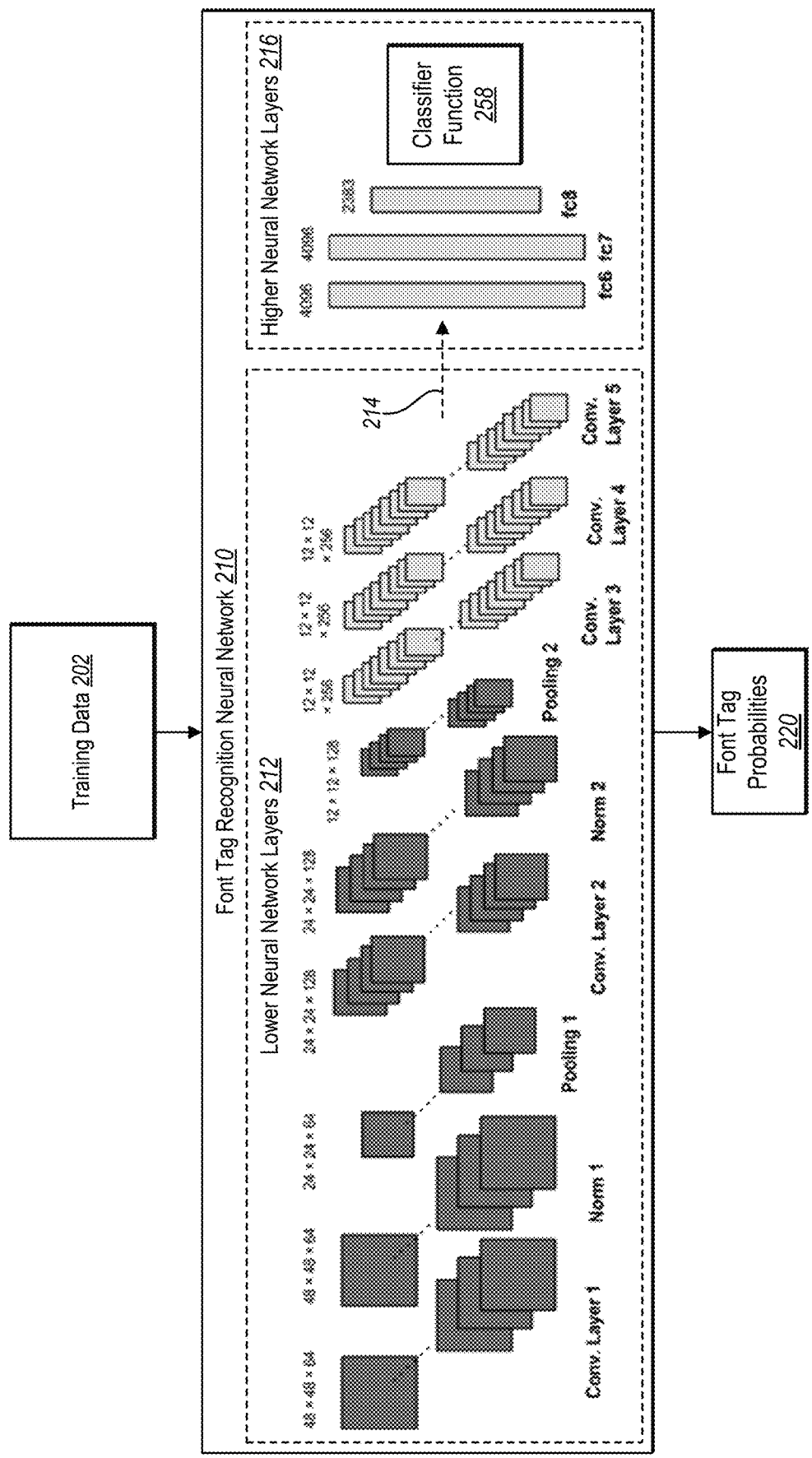

Turning now to FIG. 2B, an example architecture of the font tag recognition neural network 210 is illustrated. To provide context, FIG. 2B includes the font retrieval system providing the training data 202 to the font tag recognition neural network 210 that generates the font tag probabilities 220, as described above.

In particular, the font tag recognition neural network 210 in FIG. 2B shows that lower neural network layers 212 includes five convolutional layers. In some embodiments, a rectified linear unit (ReLU) non-linearity is applied to the output of each convolutional and fully connected layer. In addition, in various embodiments, the font tag recognition neural network 210 includes two normalization layers and/or two max-pooling layers. FIG. 2B also includes example neuron dimensions for each layer (i.e., 48×48×64 neurons for the first convolutional layer).

The font retrieval system feeds the feature vectors 214 outputted from the lower neural network layers 212 to the higher neural network layers 216, as explained earlier. As shown, the higher neural network layers 216 include fully-connected layers (i.e., fc6, fc7, fc8) and a classifier function 258. As shown, the first two fully-connected layers are 4,096-dimensional while the last fully-connected layer is 2,383-dimension. In this example, 2,383 indicates 2,383 font tags (or 2,383 fonts in the case of a font retrieval neural network 230). In this manner, the classifier function 258 outputs a 2,383-dimension font tag probability vector.

Moreover, in some embodiments, the font retrieval system utilizes the ResNet-50 architecture as the basic CNN architecture for the font tag recognition neural network 210 and/or the font retrieval neural network 230. In alternative embodiments, the font retrieval system utilizes the ResNet-18 architecture. Further, in some embodiments, the font retrieval system can employ a learning rate of 0.00005 for the convolutional layers and of 0.0005 for the fully-connected layers.

FIGS. 2A-2B describes various embodiments of training (separately and jointly) the font tag recognition neural network 210 and/or the font retrieval neural network 230. Accordingly, the actions and algorithms described in connection with FIGS. 2A-2B provide an example structure and architecture for performing a step for training a tag-based font retrieval neural network 230 to generate comprehensive affinity scores 240 that provide unbiased weighing of the font tags 206 based on font tag probabilities 220 determined by the trained font tag recognition neural network 210.

Further, FIGS. 2A-2B provide detail for identifying training font images that render a plurality of fonts where each of the training font images (e.g., font character images 204) include one or more font tags (e.g., font tags 206). Additionally, FIGS. 2A-2B provide detail for training the font tag recognition neural network 210 to determine tag-based font tag probabilities 220 for each font of the plurality of fonts using the font training images and the font tags corresponding to the font training images.

Figure 3A:
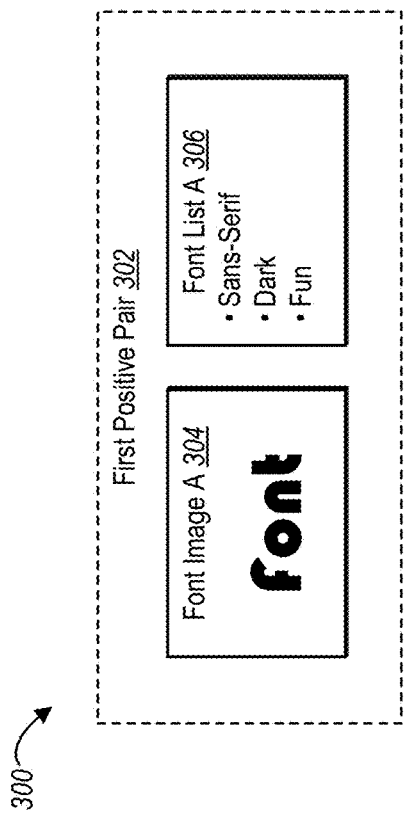
FIGS. 3A-3B illustrate example diagrams of training pairs utilized to train the font tag recognition neural network and the tag-based font retrieval neural network in accordance with one or more embodiments.
Figure 3B:
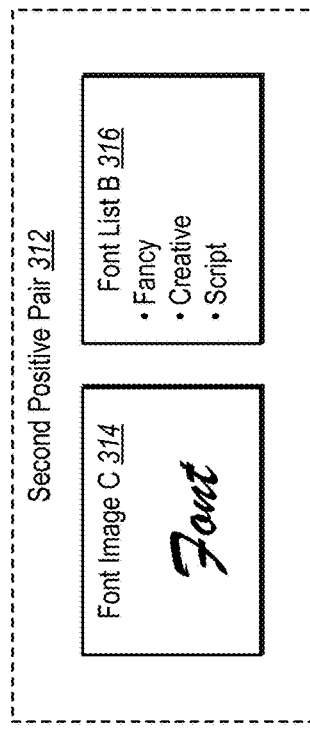

Turning now to FIGS. 3A-3B, additional detail is provided regarding creating training pairs to train the combined font neural networks. In particular, FIGS. 3A-3B illustrate examples of training pairs utilized to train the font tag recognition neural network and the tag-based font retrieval neural network in accordance with one or more embodiments. To illustrate, FIG. 3A shows a first training pair set 300 that includes a first positive pair 302 and a first negative pair 308.

As shown, the first positive pair 302 includes a first font image 304 (i.e., Font Image A) and a first font list 306 (i.e., Font List A). The second negative pair 312 includes a second font image 310 (i.e., Font Image B) and the first font list 306 (i.e., Font List A). Indeed, the first training pair set 300 includes the same font list with different font images (i.e., font character images). In this manner, the first positive pair 302 has a font image and corresponding font tag list while the first negative pair 308 has a different font image and a non-corresponding font tag list (as the font tag list corresponds to the first font image 304 and not the second font image 310).

In one or more embodiments, to generate the first training pair set 300, the font retrieval system randomly selects a group of font tags (e.g., 2-5 font tags). Then, the font retrieval system semi-randomly selects a font that includes all of the selected font tags and renders the font as the first font image 304 in the first positive pair 302 (or a set of multiple first font images paired with the first font list 306). Additionally, the font retrieval system semi-randomly selects a font that does not include all of the selected font tags and renders the font as the second font image 310 in the first negative pair 308.

In alternative embodiments, the font retrieval system first selects font images and then selects a corresponding and non-corresponding font tags list. For example, the font retrieval system randomly selects a font from available fonts in a training dataset and renders the first font image 304 (e.g., renders one or more characters in the selected font). Further, the font retrieval system identifies font tags that correspond to the selected first font. In some embodiments, the font retrieval system randomly selects a subset (e.g., 2-5 font tags) from the corresponding font tags, which the font retrieval system utilizes as the first font list 306. In other embodiments, the font retrieval system utilizes all of the font tags that correspond to a font image as the first font list 306. In this manner, the positive pair 302 is a corresponding font image/font tag list pair.

In additional embodiments, the font retrieval system generates the first negative pair 308 by selecting a font that does not correspond to the selected font tags. In these embodiments, the second font image 310 may still serve as the first negative pair 308 when it corresponds to some, but not all, of the font tags in the first font list 306. Indeed, in the first negative pair 308, the first font list 306 includes at least one font tag that does not correspond to the font in the second font image 310. Thus, the first negative pair 308 is a non-corresponding font image/font tag list pair.

As shown in FIG. 3B, the font retrieval system can also generate a second training pair set 322 that includes a second positive pair 312 and a second negative pair 318. In particular, the second positive pair 312 includes a third font image 314 (Font Image C) and a second font list 316 (i.e., Font List B). Indeed, the second training pair set 322 includes the font image with a different font list. In this manner, the second positive pair 312 has a font image and corresponding font tag list while the second negative pair 318 has the same font image and a non-corresponding font tag list.

In various embodiments, the font retrieval system can generate the second training pair set 322 in a similar manner as described above with respect to the first training pair set 300. For example, the font retrieval system randomly selects a given font to render a font image (e.g., the third font image 314). Then, for the second positive pair 312, the font retrieval system generates a group of font tags (e.g., 2-5 font tags) that correspond to the given font, which becomes the second font list 316. Similarly, for the second negative pair 318, the font retrieval system generates a group of font tags (e.g., 2-5 font tags) where one or more of the font tags do not correspond to the given font, which becomes the third font list 320.

As shown, the font retrieval system can generate both a first training pair set 300 and a second training pair set 322. While each training pair includes pairs of font images and font tag lists (e.g., font tag queries), the two training pair sets combine the font images and font tag lists differently. As mentioned above, the font retrieval system generally utilizes the first training pair set 300 to train the font retrieval neural network 230. Because the inputs of the font lists between the first positive pair 302 and the first negative pair 308 (e.g., the first font list 306) are the same, the font retrieval system can train the font retrieval neural network with or without utilizing the font tag recognition neural network, as described above. Further, because the first font list 306 serves as the ground-truth, the retrieval error loss for the second negative pair 318 should be greater than the retrieval error loss for the second positive pair 312.

Similarly, when using the second training pair set 322 as input to the font tag recognition neural network, the input font image (e.g., the third font image 314) is the same while the corresponding ground-truths (e.g., the second font list 312 and the third font list 320) differ. As a result, the tag error loss should be greater for the first negative pair 308 than for the first positive pair 302.

Figure 4:
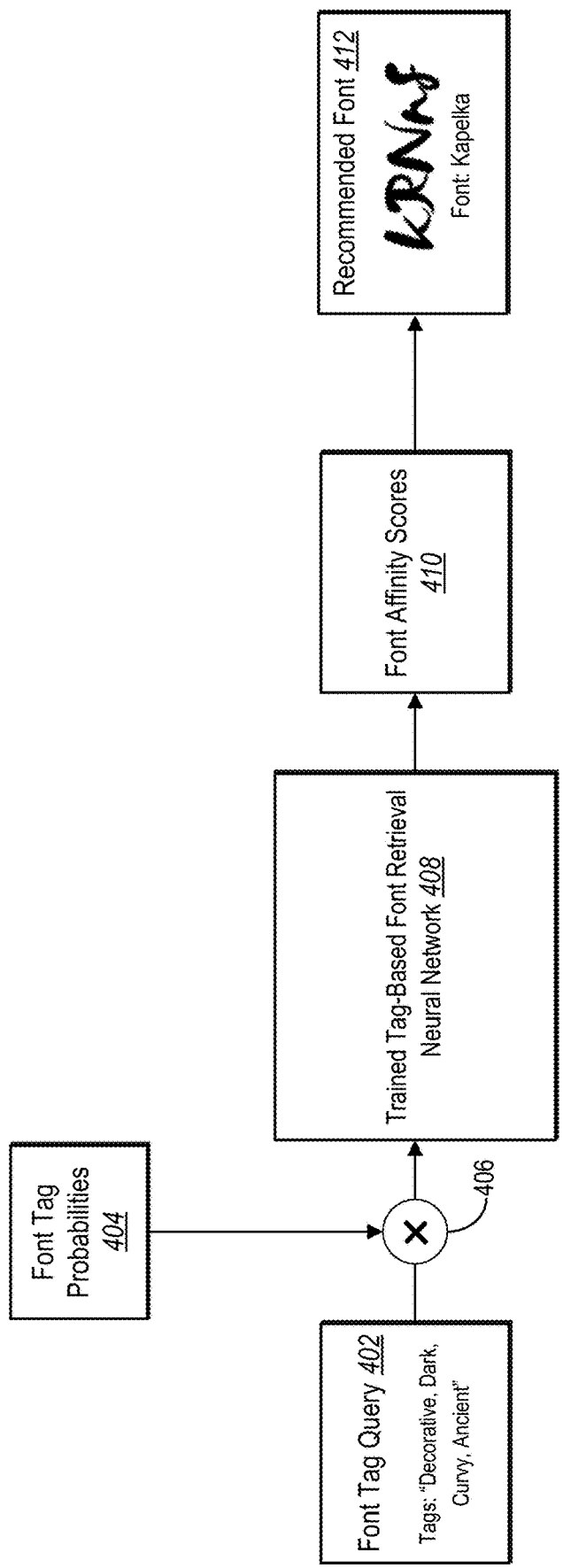
FIG. 4 illustrates a diagram of retrieving fonts based on a font tag query in accordance with one or more embodiments.

Turning now to FIG. 4, additional detail is provided regarding utilizing a trained font retrieval neural network to retrieve fonts from a font tag query. In particular, FIG. 4 illustrates a diagram of retrieving fonts based on a font tag query in accordance with one or more embodiments. As shown, FIG. 4 includes a font tag query 402 that includes multiple font tags (i.e., the font tags of "Decorative, Dark, Curvy, and Ancient"), font tag probabilities 404, a font tag filter 406, a trained tag-based font retrieval neural network 408 (or simply "trained font retrieval neural network 408"), font affinity scores 410, and a recommended font 412 (i.e., the font "Kapelka").

In various embodiments, the font retrieval system receives the font tag query 402 as a text query from a user (or another entity). For example, a user desires to find a font that matches a list of attributes. Accordingly, the user provides or selects a list of font tags that described the desired font.

In addition, the font retrieval system obtains the font tag probabilities 404 for each font to which the font tag query 402 potentially corresponds. As described above, the font tag probabilities 404 indicate a correspondence between each font and each font tag. Thus, for each font in a set of fonts, the font retrieval system generates or maintains font tag probabilities for each font tag from a set of font tags.

In one or more embodiments, the font retrieval system generates and stores the font tag probabilities 404 in a font tag probabilities database. In these embodiments, the font retrieval system retrieves the font tag probabilities 404 from the font tag probabilities database. In alternative embodiments, the font retrieval system generates the font tag probabilities 404 in response to receiving the font tag query 402. For example, the font retrieval system feeds each font (e.g., glyph images of each font) through a trained font tag recognition neural network to generate the font tag probabilities 404.

Upon receiving the font tag query 402 and the font tag probabilities 404, the font retrieval system generates filtered font tag probabilities. As shown, the font retrieval system utilizes the font tag filter 406 to select font tag probabilities for the font tag probabilities 404 that correspond to font tags in the font tag query 402. In this manner, the font retrieval system generates filtered font tag probabilities based on the font tag query 402. In some embodiments, the font retrieval system vectorizes the font tag query 402 (e.g., using binary encoding as described above), before combining the font tag query 402 with the font tag probabilities 404 at the font tag filter 406 (e.g., using elementwise multiplication as described above).

Furthermore, the font retrieval system feeds the filtered font tag probabilities to the trained font retrieval neural network 408. The trained font retrieval neural network 408 predicts font affinity scores 410 based on the filtered font tag probabilities for each font in the font set that indicates a balance and comprehensive similarity between each of the fonts in the font set and all of the font tags in the font tag query 402.

More particularly, in one or more embodiments, the trained font retrieval neural network 408 feeds the filtered font tag probabilities for each font (e.g., the font tag probabilities for the font filtered by the font tag query 402) into a first fully-connected layer that includes a tuned power activation function. As previously described, the power activation function outputs raw font affinity score for the font based on the filtered font tag probabilities. Further, the font retrieval system feeds the output of the first fully-connected layer to the second fully-connected layer that includes a sigmoid activation function. As explained earlier, the second fully-connected layer converts the raw font affinity score for the font into a normalized font affinity score in the range of 0-1. The font retrieval system feeds the filtered font tag probabilities for each font into the trained font retrieval neural network 408 to generate the font affinity scores 410.

Next, utilizing the font affinity scores 410, the font retrieval system can retrieve one or more fonts that best correspond to the font tag query 402. For example, the font retrieval system ranks the font affinity scores 410 to determine the font(s) having the most favorable (e.g., highest) font affinity score(s). Upon identifying the font(s) with the most favorable font affinity score(s), the font retrieval system provides the retrieved font as the recommended font 410.

In one or more embodiments, the font retrieval system provides multiple fonts to the user. For instance, the font retrieval system retrieves the top x number or percent of fonts based on the font affinity scores 410. In another instance, the font retrieval system recommends all fonts over a threshold recommendation threshold (e.g., number or percent) to a user in response to a font tag query 402.

The font retrieval system can occasionally update the trained font retrieval neural network 408 to include new fonts, font tags, or to improve existing learned font tag retrieval data. For example, the font retrieval system identifies a new font whose deep features have not been learned by the trained font retrieval neural network 408. In response, the font retrieval system can generate font character images and ground-truth data as new training data and feed the new training data through the combined font neural networks using the actions and processes described above in connection with FIG. 2A.

FIG. 4 describes various embodiments of retrieving a font based on a font tag query. Accordingly, the actions and algorithms described in connection with FIG. 4 provides an example structure and architecture for performing a step for generating comprehensive affinity scores 410 that indicate similarities between a plurality of fonts and a plurality of font tags within a font tag query 402 based on the trained tag-based font retrieval neural network 408. Further, FIG. 4 provides detail for providing, in response to the font tag query that includes the plurality of font tags, one or more fonts from the plurality of fonts based on comprehensive font affinity scores of the one or more fonts.

Figure 5:
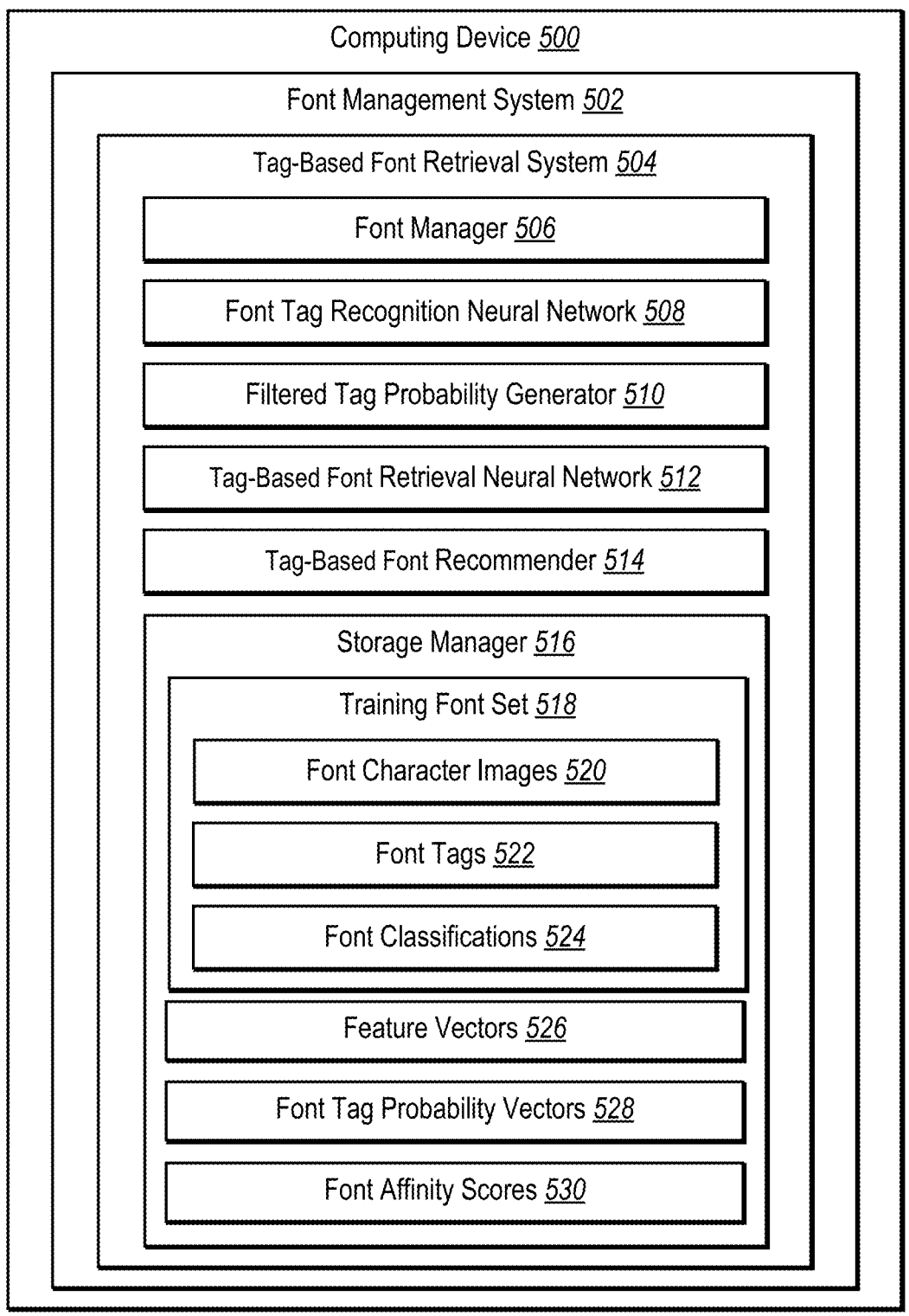
FIG. 5 illustrates a schematic diagram of a font retrieval system in accordance with one or more embodiments.

Referring now to FIG. 5, additional detail will be provided regarding capabilities and components of the font retrieval system (i.e., tag-based font retrieval system) in accordance with one or more embodiments. In particular, FIG. 5 shows a schematic diagram of an example architecture of the tag-based font retrieval system 504 (or simply "font retrieval system 504") located within a font management system 502 and hosted on a computing device 500. The font retrieval system 504 can represent one or more embodiments of the font retrieval system described previously.

As shown, the font retrieval system 504 is located on a computing device 500 within a font management system 502. In general, the computing device 500 may represent various types of client devices. For example, in some embodiments, the client is a mobile device, such as a mobile telephone, a smartphone, a tablet, or a laptop. In other embodiments, the computing device 500 is a non-mobile device, such as a desktop or a server. In some embodiments, portions of the computing device 500 correspond to computing devices of different types (e.g., some components operate on the computing device 500 when acting as a server device and some components operate on the computing device 500 when acting as a client device). Additional details with regard to the computing device 500 are discussed below with respect to FIG. 10.

The font management system 502, in general, facilitates the creation, modification, sharing, installation, receipt, and/or deletion of digital fonts within electronic documents and/or system applications. For example, the font management system 502 stores a repository of fonts on the computing device 500, such as in a font database (not shown). In addition, the font management system 502 can access additional fonts located remotely. Further, in some embodiments, the font management system 502 can be located separately from the computing device 500 and provide fonts to the computing device 500. In one or more embodiments, the font management system 502 comprises ADOBE® TYPE-KIT®.

In addition, the font management system 502 can operate in connection with one or more applications to display fonts on the computing device 500. For example, in one or more embodiments, the font management system 502 provides fonts to a word processing application such as ADOBE® ACROBAT®, INDESIGN®, SPARK POST®, or another word processing application. In other embodiments, the font management system 502 provides fonts to a design application such as ADOBE® ILLUSTRATOR®, PHOTO-SHOP®, or other CREATIVE CLOUD® applications.

As illustrated in FIG. 5, the font retrieval system 504 includes various components. For example, the font retrieval system 504 (i.e., the tag-based font retrieval system 504) includes a font manager 506, a font tag recognition neural network 508, a filtered tag probability generator 510, a tag-based font retrieval neural network 512 (or simply "font retrieval neural network 512"), a tag-based font recommender 514, and a storage manager 516. Each of these components is described below in turn.

The font manager 506 can store, receive, detect, install, order, and/or organize fonts within the computing device 500. For example, in one or more embodiments, the font manager 506 stores a set of fonts on the computing device 500. In some embodiments, the font manager 506, in connection with the font management system 502, maintains fonts within a font database. For instance, the font manager 506 maintains a set of fonts that a user can employ in an electronic document. In an additional example, the font manager 506 maintains a training font set 518. In various embodiments, the font manager 506 can identify and access additional fonts not stored or located on the computing device 500.

The font manager 506 can generate the training font set 518 used to train the font tag recognition neural network 508 and/or the font retrieval neural network 512. For example, the font manager 506 renders font character images 520 from random characters (i.e., glyphs) for each font in a font set, as previously described. Further, in various embodiments, the font manager 506 generates training pairs, such as the positive and negative pairs described above in connection with FIGS. 3A-3B.

In one or more embodiments, the font manager 506 associates font tags 522 and font classifications 524 with each of the rendered font character images 520. In various embodiments, the font manager 506 stores the generated training font set 518 (including font character images 520, font tags 522, and font classifications 524) and/or training pairs in the storage manager 516 of the computing device 500. In alternative embodiments, the font manager 506 utilizes remote storage.

As shown in FIG. 5, the font retrieval system 504 includes the font tag recognition neural network 508. As described above, the font retrieval system trains the font tag recognition neural network 508 to learn a correlation between fonts and font tags. The font tag recognition neural network 508 can include multiple neural network layers, such as convolutional layers, fully-connected layers with a sigmoid function classifier, (and loss layers during training). Example architecture of the font tag recognition neural network 508 is provided above with respect to FIGS. 2A-2B.

In addition, the font tag recognition neural network 508 can generate feature vectors 526, such as font tag recognition feature vectors that encode deep or hidden visual effects of fonts in relation to font tags. In addition, the font tag recognition neural network 508 can generate font tag probability vectors 528. For example, the font tag recognition neural network 508 generates font tag probability vectors.

Moreover, the font retrieval system 504 includes the filtered tag probability generator 510. In general, the filtered tag probability generator 510 combines font tag probability vectors 528 with vectors of font tags 522 to generate filtered font tag probability vectors. In various embodiments, the filtered tag probability generator 510 vectorizes a list of font tags 522 to obtain filtered tag probability vectors, as described above. Further, in some embodiments, the filtered tag probability generator 510 utilizes elementwise multiplication (or another formulation) to generate the filtered tag probability vectors.

As also shown in FIG. 5, the font retrieval system 504 includes the font retrieval neural network 512. As described above, the font retrieval system trains the font retrieval neural network 512 to generate font affinity scores 530 fonts based on the font tag probability vectors 528 (including filtered tag probability vectors). The font retrieval neural network 512 can utilize fully-connected layers with a power activation function and a sigmoid classifier (and loss layers during training). Example architecture of the font retrieval neural network 512 is provided above with respect to FIG. 2A.

As shown, the font retrieval system 504 includes the tag-based font recommender 514. The tag-based font recommender 514 can retrieve fonts in response to a font tag query. For example, the filtered tag probability generator 510 generates filtered font tag probabilities from font tags from a font tag query and font tag probability vectors 528 generated by the font tag recognition neural network 508. The tag-based font recommender 514 then feeds the filtered tag probability vectors to a trained font retrieval neural network 512 to obtain font affinity scores 530. Then, using the font affinity scores 530, the tag-based font recommender 514 identifies one or more fonts that best match the font tag query and retrieves the one or more fonts. In addition, the tag-based font recommender 514 provides the retrieved fonts as recommended fonts in response to the font tag query.

Further, as shown, the font retrieval system 504 includes the storage manager 516. The storage manager 516 communicates with other components of the font retrieval system 504 to store, maintain, and access data used to train the font neural networks and models disclosed herein (e.g., the training font set 518, the feature vectors 526, the font tag probability vectors 528 (including filtered tag probability vectors), and the font affinity scores 530).

Each of the components 506-530 of the font retrieval system 504 can include software, hardware, or both. For example, the components 506-530 can include one or more instructions stored on a computer-readable storage medium and executable by processors of one or more computing devices, such as a client device or server device. When executed by the one or more processors, the computer-executable instructions of the font retrieval system 504 can cause the computing device(s) to perform the feature learning methods described herein. Alternatively, the components 506-530 can include hardware, such as a special-purpose processing device to perform a certain function or group of functions. Alternatively, the components 506-530 of the font retrieval system 504 can include a combination of computer-executable instructions and hardware.

Furthermore, the components 506-530 of the font retrieval system 504 may, for example, be implemented as one or more operating systems, as one or more stand-alone applications, as one or more modules of an application, as one or more plug-ins, as one or more library functions or functions that may be called by other applications, and/or as a cloud computing model. Thus, the components 506-530 may be implemented as a stand-alone application, such as a desktop or mobile application. Furthermore, the components 506-530 may be implemented as one or more web-based applications hosted on a remote server. The components 506-530 may also be implemented in a suite of mobile device applications or "apps." To illustrate, the components 506-530 may be implemented in an application, including but not limited to ADOBE ACROBAT®, ADOBE® TYPEKIT®, INDESIGN®, ADOBE® SPARK POST®, ADOBE® ILLUSTRATOR®, ADOBE PHOTOSHOP®, ADOBE® CREATIVE CLOUD® software. "ADOBE," "ACROBAT," "TYPEKIT," "INDESIGN," "SPARK POST," "ILLUSTRATOR," "PHOTOSHOP," and "CREATIVE CLOUD" are either registered trademarks or trademarks of Adobe Inc. in the United States and/or other countries.

Figure 6:
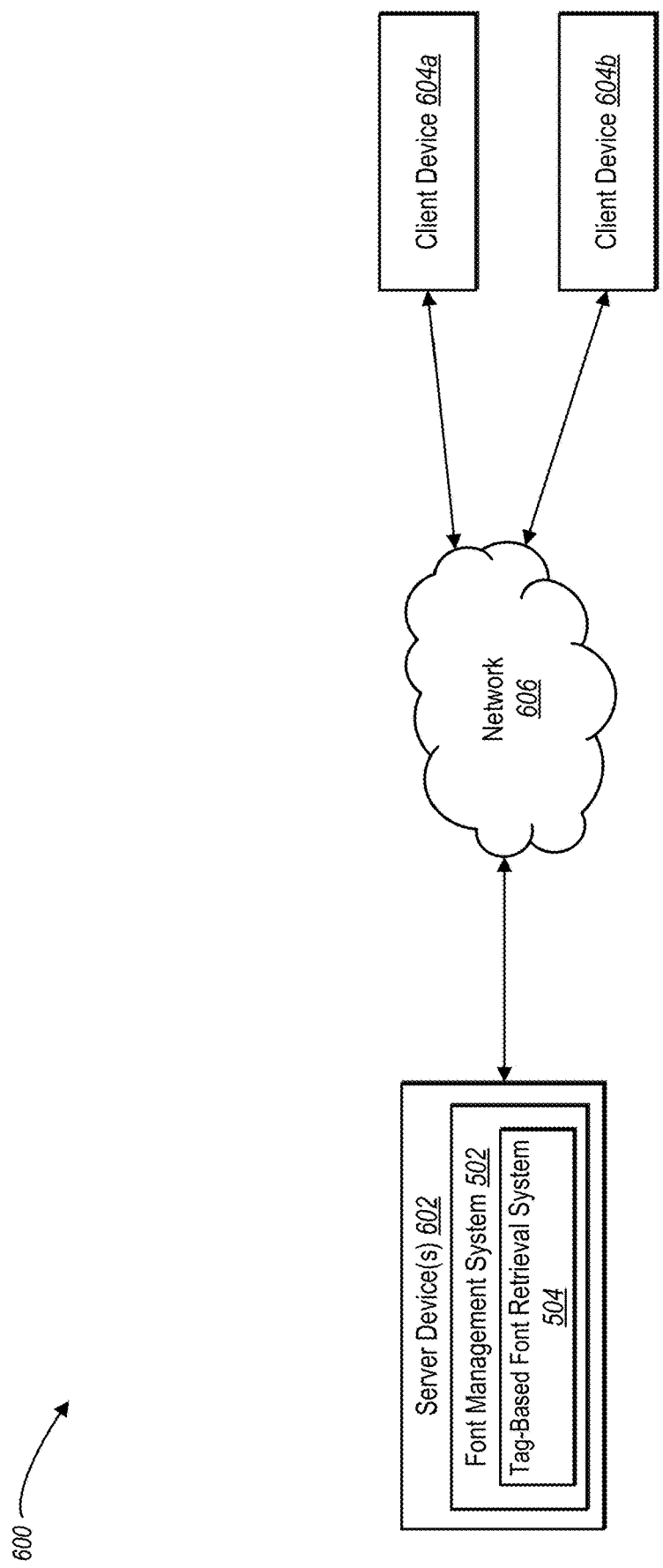
FIG. 6 illustrates a schematic diagram of an example environment in which the font retrieval system may be implemented in accordance with one or more embodiments.

FIG. 6 illustrates a schematic diagram of an environment 600 in which the font retrieval system 504 (or simply "font retrieval system 504") may be implemented in accordance with one or more embodiments. In one or more embodiments, the environment 600 includes various computing devices including server device(s) 602 and one or more client devices 604a, 604b. In addition, the environment 600 includes a network 606. The network 606 may be any suitable network over which the computing devices can communicate. Example networks are discussed in more detail below with regard to FIG. 10.

As illustrated in FIG. 6, the environment 600 includes the server device(s) 602, which may comprise any computing device, such as one or more of the computing devices described below in relation to FIG. 10. In addition, the server device(s) 602 includes the font management system 502 and the font retrieval system 504, which are described previously. For example, as described above, the font retrieval system 504 can train and apply tag-based font neural networks to retrieve font tags in response to font tag queries.

In addition, the environment 600 includes the one or more client devices 604a, 604b. The client devices 604a, 604b may comprise any computing device, such as the computing device described below in relation to FIG. 10. As described above, the one or more client devices 604a, 604b can utilize the trained font tag database to retrieve fonts based on a font tag query.

As illustrated, in one or more embodiments, the server device(s) 602 can include all, or a portion of, the font retrieval system 504 (i.e., tag-based font retrieval system 504). In particular, the font retrieval system 504 can comprise an application running on the server device(s) 602 or a portion of a software application that can be downloaded from the server device(s) 602. For example, the font retrieval system 504 can include a web hosting application that allows a client device 604a to interact with content hosted on the server device(s) 602. To illustrate, in one or more embodiments of the environment 600, the client device 604a accesses a web page supported by the server device(s) 602 implementing the font retrieval system 504. In particular, the client device 604a can run an application to allow a user to access, view, select, and/or identify a font tag query within a web page or website hosted at the server device(s) 602 (e.g., a web page enables a user to provide a font tag query, and in response, utilizes the font retrieval system 504 to retrieve and recommend one or more fonts).

Although FIG. 6 illustrates a particular arrangement of the server device(s) 602, the client devices 604a, 604b and the network 606, various additional arrangements are possible. For example, while FIG. 6 illustrates the one or more client devices 604a, 604b communicating with the server device(s) 602 via the network 606, in one or more embodiments a single client device may communicate directly with the server device(s) 602, bypassing the network 606.

Similarly, although the environment 600 of FIG. 6 is depicted as having various components, the environment 600 may have additional or alternative components. For example, the font retrieval system 504 can be implemented on multiple computing devices. In particular, the font retrieval system 504 may be implemented in whole by the server device(s) 602 or the font retrieval system 504 may be implemented in whole by the client device 604a. Alternatively, the font retrieval system 504 may be implemented across multiple devices or components (e.g., utilizing the server device(s) 602 and the one or more client devices 604a, 604b).

Figure 7A:
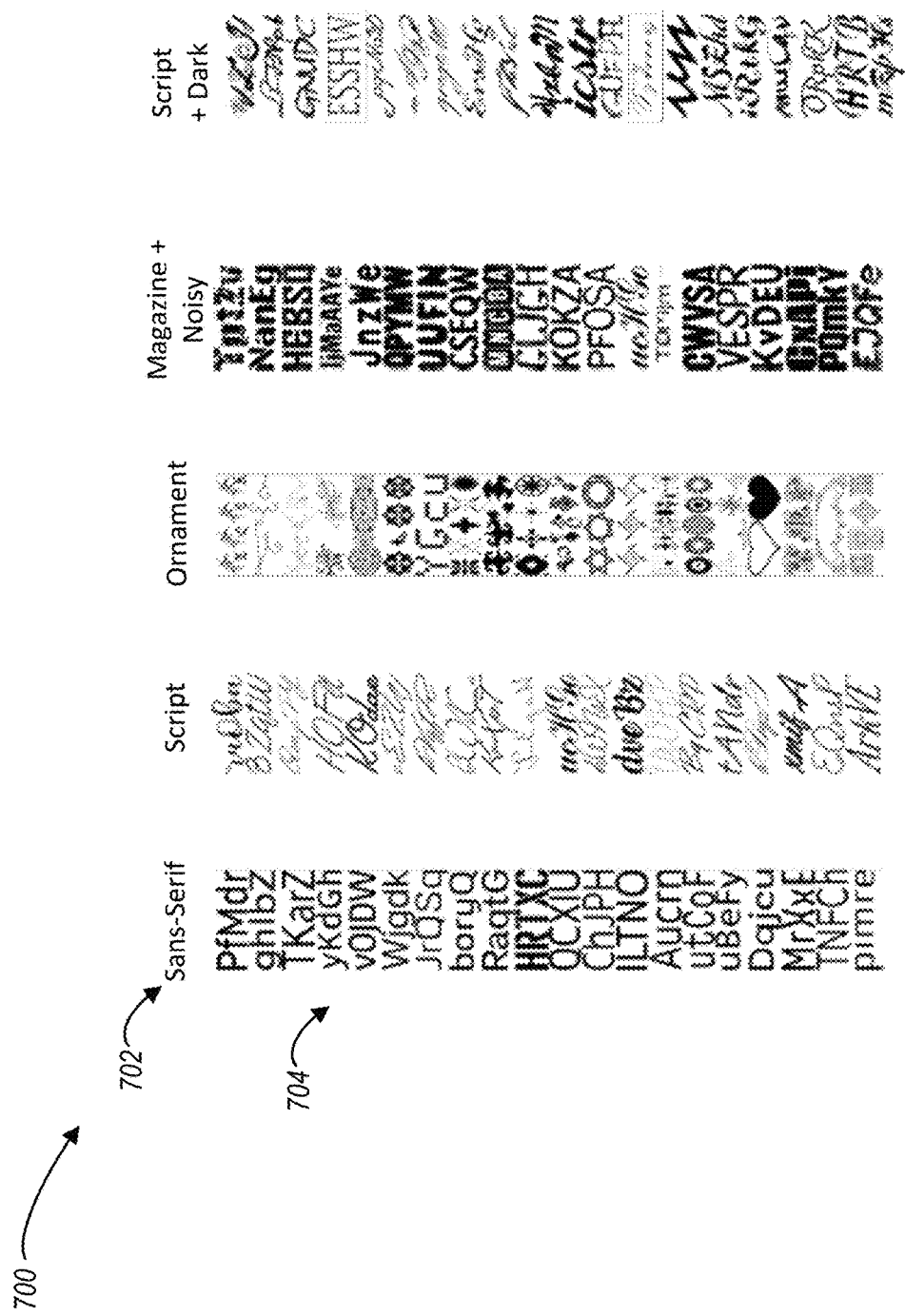

Turning now to the next figures, FIGS. 7A-7B illustrate sample retrieved fonts based on font tag queries in accordance with one or more embodiments. To illustrate, FIG. 7A illustrates sample retrieved fonts 700 based on font tag queries 702 in accordance with one or more embodiments. In particular, FIG. 7A includes font tag queries 702 (showing single and multiple font tags) and recommended fonts 704 retrieved by the font retrieval system 504 in response to the font tag queries 702, as described above. As shown, the recommended fonts 704 include the top-20 fonts that correspond to each of the font tag queries 702. In particular, the sample retrieved fonts 700 shows retrieved fonts for both single font tags (e.g., "sans-serif," "script," and "ornament") and multiple font tags (e.g., "magazine+noisy" and "script+dark").

FIG. 7B shows a comparison of the top-ten retrieved fonts between a font tag recognition neural network (i.e., the recognition model 710) and the font retrieval system 504 (i.e., the Recognition/Retrieval Model 720) described in various embodiments herein. As indicated below, the font tag recognition neural network (modified to retrieve fonts directly based on font tag probabilities) yielded the next best qualitative results compared to the font retrieval system 504. As such, FIG. 7B shows that the font retrieval system 504 achieves better qualitative results than the next best model. Accordingly, the font retrieval system 504 (i.e., the Recognition/Retrieval Model 720) solves the font tag domination problem for multi-font tag queries, especially for font tags that occur infrequently in a font set.

Further to this point, while not illustrated, the results the of recognition model 710 for the font tags of "Sans-Serif+Dark" are almost identical to the results of the recognition model 710 retrieving fonts for the single font tag "Sans-Serif." Indeed, only one font differs between the recognition model 710 retrieving the top-ten fonts for the single font tag query of "Sans-Serif" and the multiple font tag query of "Sans-Serif+Dark." In contrast, the results between the font tag queries of "Sans-Serif" and "Sans-Serif+Dark" for the Recognition/Retrieval Model 720 (i.e., font retrieval system 504) appear as different as the two samples shown in FIG. 7B.

As mentioned above, FIGS. 7A-7B show qualitative results of the font retrieval system 504. With respect to quantitative results, as mentioned above, researchers compared embodiments of the font retrieval system to baseline neural networks and found that the font retrieval system outperformed these baseline neural networks. More particularly, the researchers evaluated the effectiveness of the font retrieval system 504 based on a standard retrieval measure of mean average precision (MAP). To illustrate, using the MAP measure, the researchers evaluated M tag queries for a specific query q. By way of context, if the positive fonts $f_1, f_2, f_3 \ldots f_N$ receive probability ranks of $r_1, r_2, r_3 \ldots r_N$, then, the average precision score of q is computed as shown in Equation 3 below.

$$\text{Average Precision}_q = \sum_{n=1}^{N} \frac{n}{r_n} \quad (6)$$

The font retrieval system 504 then generates the mean values of each the average precision score for each query to obtain the MAP.

To evaluate the embodiments of the font retrieval system 504 to the baseline neural networks, the researchers obtained a training set of 19,161 fonts and 1,923 font tags. In addition, the researchers tested both single-font tag queries as well as multi-font tag queries. For the single-font tag queries, the test query list included a set of 1923 font tags, where each tag was used as a single-font tag query. For each of the single font-tag queries, a font achieves a positive result if the ground-truth font tag list for the retrieved font included the font tag from the single-font tag query.

For the multi-font tag queries, for each font in the test set, the researchers randomly generated a subset of font tags that includes two to five font tags from the ground-truth font tag list of the font, which the researches used as the multi-font tag query. For each of the multi-font tag queries, a font achieves a positive result if the ground-truth font tag list includes all of the font tags of the multi-font tag query.

Regarding the baseline models tested against the font retrieval system 504, the researchers built a font tag recognition model (referenced in FIG. 7B), a font retrieval model, and a voting-based font model. The researchers trained each of the models to predict font affinity scores between a font image and font tag query. In particular, the researchers generated font affinity scores toward a query by averaging font affinity scores across multiple font image samples from the font.

Because of the differences in the baseline models, the researchers individually trained each model. For example, with respect to the font tag recognition model, the researchers inputted font images and output font tag probabilities, which were converted in the font affinity scores. When a multi-font tag query was tested, the font tag recognition model summed the corresponding font tag probabilities before converting the aggregated font tag probabilities into the font affinity scores. With respect to the font retrieval model, the researchers inputted font images and a font tag list and received font affinity scores as the output. The font retrieval model was trained to predict high font affinity scores for corresponding pairs and low font affinity scores for non-corresponding pairs. With respect to the voting-based font model, the researchers inputted font images and received a candidate font list as the output. For instance, the voting-based font model determined candidate fonts based on the ground-truth font tag lists of the most similar font images in the training set toward the input font. Additionally, the voting-based font model employed cosine similarity between a query and an input image's candidate tag list to represent their affinity score.

For each of the font tag query lists, the font retrieval system 504 computed the MAP using Equation 6, as described above. Table 1 below includes the MAP score comparisons between embodiments of the font retrieval system 504 to the baseline models.

TABLE 1

| Type of Font Tag Retrieval Models | Mean Average Precision (Multi-Font Tag Query) | Mean Average Precision (Multi-Font Tag Query) |
|---|---|---|
| Font Retrieval Model | 3.7 | 4.7 |
| Voting-Based Font Model | 8.4 | 6.8 |
| Font Tag Recognition Model | 15.0 | 7.9 |
| Font Retrieval System Model | 14.9 | 13.2 |

As shown in Table 1, the font tag recognition model outperforms the font retrieval model and the voting-based font model, which validates using the font tag recognition model as the base neural network of the font retrieval system 504. Additionally, as shown by the results, the font tag recognition model can be improved by adding a font retrieval model on top of the font tag recognition model, particularly with respect to multi-font tag queries. Indeed, by combining a font tag recognition neural network with a font retrieval neural network, the font retrieval system 504 matches or improves performance with respect to both single- and multi-font tag queries. In particular, the font retrieval system 504, as described herein utilizes a font retrieval neural network on top of a font tag recognition neural network in a manner that reduces frequency bias of font tags in a training set such that retrieve fonts fairly represent all font tags in a query.

Further, the researchers found that the jointly trained font tag recognition neural network of the font retrieval system 504 disclosed herein achieved better results over the baseline models with respect to normalized discounted cumulative gain (nDCG). In particular, the jointly trained font tag recognition neural network of the font retrieval system 504 disclosed herein performed better with respect to both single-font tag queries as well as multi-font tag queries.

Figure 8:
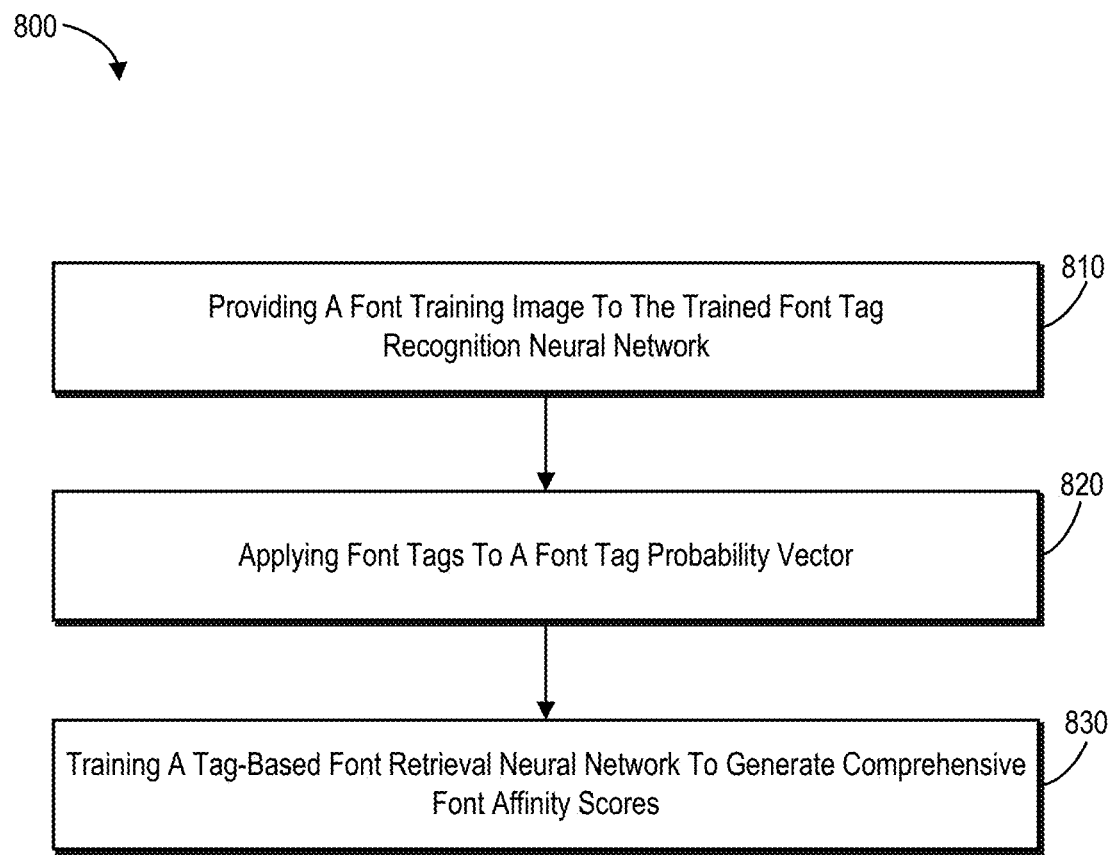
FIG. 8 illustrates a flowchart of a series of acts of training a tag-based font retrieval neural network to generate font affinity scores in accordance with one or more embodiments.
Figure 9:
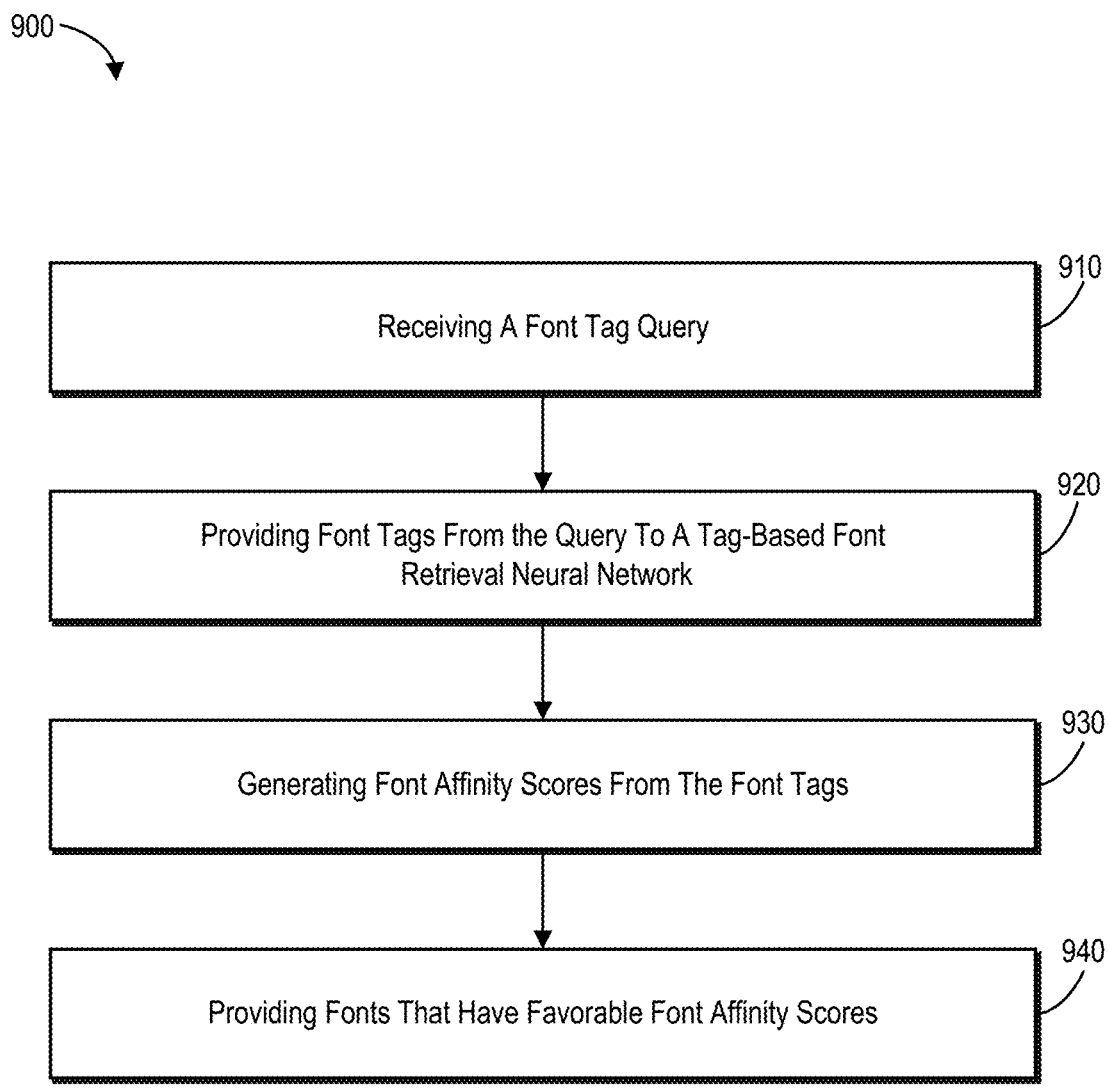
FIG. 9 illustrates a flowchart of a series of acts for recommending fonts based on a font tag query in accordance with one or more embodiments.

FIGS. 1-7B, the corresponding text, and the examples provide several different systems, methods, techniques, components, and/or devices of the font retrieval system 504 in accordance with one or more embodiments. In addition to the above description, one or more embodiments can also be described in terms of flowcharts including acts for accomplishing a particular result. For example, FIG. 8 and FIG. 9 illustrate flowcharts of an example sequence of acts in accordance with one or more embodiments. In addition, FIG. 8 and FIG. 9 may be performed with more or fewer acts. Further, the acts may be performed in differing orders. Additionally, the acts described herein may be repeated or performed in parallel with one another or parallel with different instances of the same or similar acts.

While FIG. 8 and FIG. 9 illustrate a series of acts according to particular embodiments, alternative embodiments may omit, add to, reorder, and/or modify any of the acts shown. The series of acts of FIG. 8 and FIG. 9 can be performed as part of a method. Alternatively, a non-transitory computer-readable medium can comprise instructions, when executed by one or more processors, cause a computing device (e.g., a client device and/or a server device) to perform the series of acts of FIG. 8 and FIG. 9. In still further embodiments, a system performs the series of acts of FIG. 8 and FIG. 9.

In addition, the series of acts of FIG. 8 and FIG. 9 can be implemented on one or more computing devices, such as the computing device 500 or the server device(s) 602. In addition, in some embodiments, the series of acts of FIG. 8 and FIG. 9 can be implemented in a digital environment for creating or editing electronic documents. In various embodiments, the series of acts of FIG. 8 and FIG. 9 are implemented on a computing device having a memory that stores digital fonts. In some embodiments, the memory stores font training images rendered from the digital fonts and corresponding font tags. In various embodiments, the memory stores a font tag recognition neural network trained to determine font tag probability vectors for fonts of a plurality of digital fonts using the font training images and the corresponding font tags and/or a tag-based font retrieval neural network.

To illustrate, FIG. 8 shows a flowchart of a series of acts 800 for training a tag-based font retrieval neural network to generate font affinity scores in accordance with one or more embodiments. As shown, the series of acts 800 includes an act 810 of providing a font training image to the trained font tag recognition neural network. In particular, the act 810 can involve providing a font training image from the font training images to the trained font tag recognition neural network to generate a font tag probability vector. In some embodiments, the font tag probability vectors generated by the font tag recognition neural network indicate the probability of each of the font tags being associated with a font rendered in the font training image.

As shown, the series of acts 800 also includes an act 820 of applying font tags to a font tag probability vector. In particular, the act 820 can involve applying font tags corresponding to the font training image to the font tag probability vector to generate a filtered tag probability vector. In some embodiments, the act 820 includes generating a binary encoding of the font tags corresponding to the font training image. In additional embodiments, the act 820 includes applying an elementwise multiplication between the font tag probability vector and the binary encoding of the font tags corresponding to the font training image.

As shown in FIG. 8, the series of acts 800 further includes an act 830 of training a tag-based font retrieval neural network to generate comprehensive font affinity scores. In particular, the act 830 can involve training a tag-based font retrieval neural network based on the filtered tag probability vector to generate comprehensive font affinity scores for each of the plurality of fonts, the comprehensive font affinity scores representing each of the font tags corresponding to the font training image. In one or more embodiments, the tag-based font retrieval neural network includes a first fully-connected layer having a power activation function and a second fully-connected layer having a sigmoid activation function, which maps output from the first fully-connected layer to a predetermined range.

In various embodiments, the act 830 is based on a pairwise loss function that compares a positive pair having a set of font tags and a corresponding font image with a negative pair having the set of font tags and a non-corresponding font image. In additional embodiments, the act 830 includes determining a pairwise loss amount based on a difference between comprehensive font affinity scores for the positive pair and comprehensive font affinity scores for the negative pair and back-propagating the pairwise loss amount to layers of the tag-based font retrieval neural network.

In some embodiments, the act 830 is based on training the font tag recognition neural network to determine the font tag probability vectors for fonts of the plurality of fonts using the font training images and the corresponding font tags; upon training the font tag recognition neural network, training the tag-based font retrieval neural network to generate the comprehensive font affinity scores for each of the plurality of fonts; and fine tuning the font tag recognition neural network and the font tag recognition neural network by jointly training the tag-based font retrieval neural network with the font tag recognition neural network. In further embodiments, the act 830 includes jointly training the tag-based font retrieval neural network and the font tag recognition neural network based on a pairwise loss function that compares a positive pair having a font image with a corresponding set of font tags and a negative pair having the font image and a non-corresponding set of font tags to generate pairwise loss that is backpropagated to both the tag-based font retrieval neural network and the font tag recognition neural network.

The series of acts 800 can also include a number of additional acts. In one or more embodiments, the series of acts 800 also includes the acts of receiving a font tag query having a plurality of font tags, providing the plurality of font tags to the trained tag-based font retrieval neural network, generating a comprehensive font affinity score for each of the plurality of fonts that indicates a balanced similarity between a given font and all of the font tags of the plurality of font tags, and providing one or more fonts from the plurality of fonts that have favorable comprehensive font affinity scores for the plurality of font tags in response to the font tag query.

As mentioned above, FIG. 9 illustrates a flowchart of a series of acts 900 for recommending fonts based on a font tag query in accordance with one or more embodiments. As shown, the series of acts 900 includes an act 910 of receiving a font tag query. In particular, the act 910 can involve receiving a font tag query including a plurality of font tags. In various embodiments, the act 910 includes receiving a text input or selection of font tags as part of a font retrieval query.

As shown the series of acts 900 comprises an act 920 of providing font tags from the query to a tag-based font retrieval neural network. In particular, act 920 can involve providing the plurality of font tags to a tag-based font retrieval neural network trained in connection with a font tag recognition neural network to generate comprehensive font affinity scores that represent each font tag in a font tag list. In some embodiments, the act 920 includes vectorizing the font tags and providing the vectorized font tags to the tag-based font retrieval neural network. In various embodiments, the act 920 includes training the tag-based font retrieval neural network based on a font tag probability vector generated by the font tag recognition neural network from a font training image and font tags corresponding to the font training image.

In some embodiments, the act 920 also includes receiving font tag probabilities for the plurality of fonts and generating filtered tag probabilities by filtering the font tag probabilities based on the plurality of font tags in the font tag query. In additional embodiments, the act 920 includes providing the filtered tag probabilities to the tag-based font retrieval neural network. In one or more embodiments, receiving the font tag probabilities for the plurality of fonts is based on generating the font tag probabilities for the plurality of fonts utilizing a trained font tag recognition neural network. In various embodiments, receiving the font tag probabilities for the plurality of fonts is based on receiving the font tag probabilities for the plurality of fonts by accessing the font tag probabilities for the plurality of fonts from a font tag probabilities database.

The series of acts 900 includes an act 930 of generating font affinity scores from the font tags. More specifically, the act 930 involves generating, by the tag-based font retrieval neural network, comprehensive font affinity scores that indicate a similarity between the plurality of font tags in the font tag query and a plurality of fonts. In various embodiments, the act 930 includes determining raw font affinity scores for the font tags utilizing a power activation function as well as normalizing the raw font affinity scores utilizing a sigmoid activation function.

In one or more embodiments, the tag-based font retrieval neural network comprises a first fully-connected layer having a power activation function and a second fully-connected layer having a sigmoid activation function that maps output from the first fully-connected layer to a predetermined range for each of the plurality of fonts. In various embodiments, the act 930 includes generating comprehensive font affinity scores by utilizing the power activation function and the sigmoid activation function with the filtered tag probabilities for each of the plurality of fonts to generate a comprehensive font affinity score for each of the plurality of fonts.

Additionally, the series of acts 900 includes the act 940 of providing fonts that have favorable font affinity scores. In particular, the act 940 can involve providing, in response to the font tag query, one or more fonts from the plurality of fonts that have favorable comprehensive font affinity scores for the plurality of font tags. In some embodiments, the act 940 includes sorting the font affinity scores to identify a given font having the most favorable font affinity score, retrieving the given font, and providing the given font to a client device associated with a user performing the font tag query search. In one or more embodiments, the act includes providing the font having the most favorable comprehensive font affinity score to a user device that provided the font tag query.

The term "digital environment," as used herein, generally refers to an environment implemented, for example, as a stand-alone application (e.g., a personal computer or mobile application running on a computing device), as an element of an application, as a plug-in for an application, as a library function or functions, as a computing device, and/or as a cloud computing system. A digital medium environment allows the font retrieval system to train and employ multiple neural networks and/or machine-learning models, as described herein.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud computing model can be composed of various characteristics such as, for example, on-demand self-service, broad network access, resource pooling, rapid elasticity, measured service, and so forth. A cloud computing model can also expose various service models, such as, for example, Software as a Service ("SaaS"), Platform as a Service ("PaaS"), and Infrastructure as a Service ("IaaS"). A cloud computing model can also be deployed using different deployment models such as private cloud, community cloud, public cloud, hybrid cloud, and so forth. In addition, as used herein, the term "cloud computing environment" refers to an environment in which cloud computing is employed.

Figure 10:
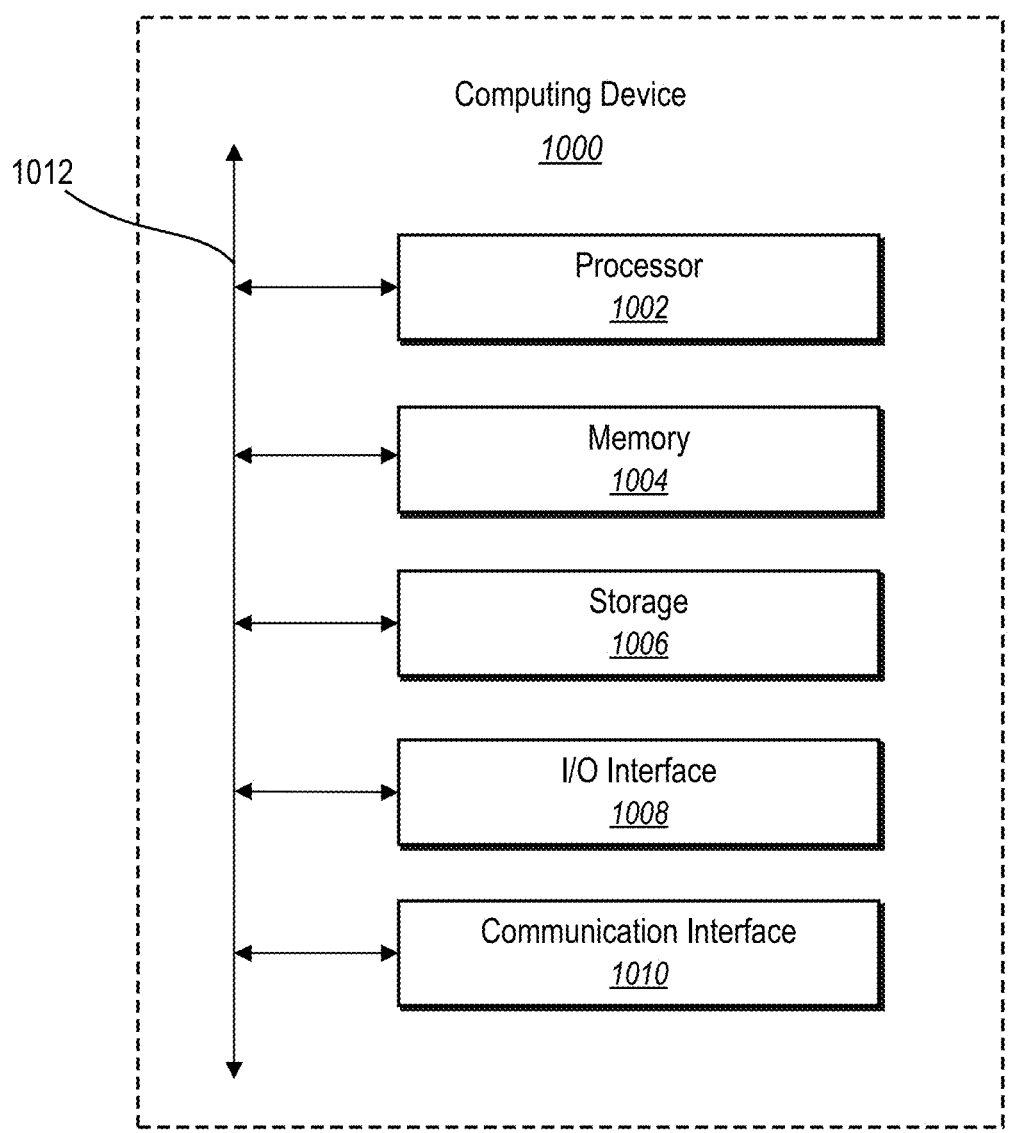
FIG. 10 illustrates a block diagram of an example computing device for implementing one or more embodiments of the present disclosure.

FIG. 10 illustrates a block diagram of an example computing device 1000 that may be configured to perform one or more of the processes described above. One will appreciate that one or more computing devices, such as the computing device 1000 may represent the computing devices described above (e.g., computing device 500, server device(s) 602, and client devices 604*a-b*). In one or more embodiments, the computing device 1000 may be a mobile device (e.g., a mobile telephone, a smartphone, a PDA, a tablet, a laptop, a camera, a tracker, a watch, a wearable device, etc.). In some embodiments, the computing device 1000 may be a non-mobile device (e.g., a desktop computer or another type of client device). Further, the computing device 1000 may be a server device that includes cloud-based processing and storage capabilities.

As shown in FIG. 10, the computing device 1000 can include one or more processor(s) 1002, memory 1004, a storage device 1006, input/output ("I/O") interfaces 1008, and a communication interface 1010, which may be communicatively coupled by way of a communication infrastructure (e.g., bus 1012). While the computing device 1000 is shown in FIG. 10, the components illustrated in FIG. 10 are not intended to be limiting. Additional or alternative components may be used in other embodiments. Furthermore, in certain embodiments, the computing device 1000 includes fewer components than those shown in FIG. 10. Components of the computing device 1000 shown in FIG. 10 will now be described in additional detail.

In particular embodiments, the processor(s) 1002 includes hardware for executing instructions, such as those making up a computer program. As an example, and not by way of limitation, to execute instructions, the processor(s) 1002 may retrieve (or fetch) the instructions from an internal register, an internal cache, memory 1004, or a storage device 1006 and decode and execute them.

The computing device 1000 includes memory 1004, which is coupled to the processor(s) 1002. The memory 1004 may be used for storing data, metadata, and programs for execution by the processor(s). The memory 1004 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1004 may be internal or distributed memory.

The computing device 1000 includes a storage device 1006 includes storage for storing data or instructions. As an example, and not by way of limitation, the storage device 1006 can include a non-transitory storage medium described above. The storage device 1006 may include a hard disk drive (HDD), flash memory, a Universal Serial Bus (USB) drive or a combination these or other storage devices.

As shown, the computing device 1000 includes one or more I/O interfaces 1008, which are provided to allow a user to provide input to (such as user strokes), receive output from, and otherwise transfer data to and from the computing device 1000. These I/O interfaces 1008 may include a mouse, keypad or a keyboard, a touch screen, camera, optical scanner, network interface, modem, other known I/O devices or a combination of the I/O interfaces 1008. The touch screen may be activated with a stylus or a finger.

The I/O interfaces 1008 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1008 are configured to provide graphical data to a display for presentation to a user. The graphical data may be representative of one or more graphical user interfaces and/or any other graphical content as may serve a particular implementation.

The computing device 1000 can further include a communication interface 1010. The communication interface 1010 can include hardware, software, or both. The communication interface 1010 provides one or more interfaces for communication (such as, for example, packet-based communication) between the computing device and one or more other computing devices or one or more networks. As an example, and not by way of limitation, communication interface 1010 may include a network interface controller (NIC) or network adapter for communicating with an Ethernet or other wire-based network or a wireless NIC (WNIC) or wireless adapter for communicating with a wireless network, such as a WI-FI. The computing device 1000 can further include a bus 1012. The bus 1012 can include hardware, software, or both that connects components of computing device 1000 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A non-transitory computer-readable medium storing instructions that, when executed by at least one processor, cause a computer system to:
   receive a texted-based font tag query comprising a plurality of font tags;
   provide the plurality of font tags to a tag-based font retrieval neural network trained in connection with a font tag recognition neural network and filtered tag probabilities to generate comprehensive font affinity scores that represent each font tag in a font tag list;
   generate, by the tag-based font retrieval neural network, comprehensive font affinity scores that indicate a similarity between the plurality of font tags in the font tag query and a plurality of fonts; and
   provide, in response to the font tag query, one or more fonts from the plurality of fonts that have favorable comprehensive font affinity scores for the plurality of font tags.

2. The non-transitory computer-readable medium of claim 1, further comprising instructions that cause the computer system to:
   receive font tag probabilities for the plurality of fonts; and
   generate the filtered tag probabilities by filtering the font tag probabilities based on the plurality of font tags in the font tag query.

3. The non-transitory computer-readable medium of claim 2, wherein the instructions cause the computer system to provide the plurality of font tags to a tag-based font retrieval neural network by providing the filtered tag probabilities to the tag-based font retrieval neural network.

4. The non-transitory computer-readable medium of claim 2, further comprising instructions that cause the computer system to generate the font tag probabilities for the plurality of fonts utilizing a trained font tag recognition neural network.

5. The non-transitory computer-readable medium of claim 2, wherein the instructions cause the computer system to receive the font tag probabilities for the plurality of fonts by accessing the font tag probabilities for the plurality of fonts from a font tag probabilities database.

6. The non-transitory computer-readable medium of claim 2, wherein the tag-based font retrieval neural network comprises:
   a first fully-connected layer having a power activation function; and
   a second fully-connected layer having a sigmoid activation function that maps output from the first fully-connected layer to a predetermined range for each of the plurality of fonts.

7. The non-transitory computer-readable medium of claim 6, wherein the instructions cause the computer system to generate the comprehensive font affinity scores by utilizing the power activation function and the sigmoid activation function with the filtered tag probabilities for each of the plurality of fonts to generate a comprehensive font affinity score for each of the plurality of fonts.

8. The non-transitory computer-readable medium of claim 1, wherein the instructions cause the computer system to provide the one or more fonts from the plurality of fonts by providing the font having the most favorable comprehensive font affinity score to a user device that provided the font tag query.

9. A system for training a tag-based font tag recognition neural network comprising:
   a memory comprising:
     font training images rendered in a plurality of fonts;
     font tags corresponding to the plurality of fonts;
     a font tag recognition neural network trained to determine font tag probability vectors for fonts of the plurality of fonts using the font training images and the corresponding font tags; and
     a tag-based font retrieval neural network;
   at least one processor; and
   at least one non-transitory computer-readable storage medium storing instructions that, when executed by the at least one processor, cause the system to:
     provide a font training image from the font training images to the trained font tag recognition neural network to generate a font tag probability vector;
     apply text-based font tags corresponding to the font training image to the font tag probability vector to generate a filtered tag probability vector; and
     train the tag-based font retrieval neural network based on the filtered tag probability vector to generate comprehensive font affinity scores for each of the plurality of fonts, the comprehensive font affinity scores representing each of the font tags corresponding to the font training image.

10. The system of claim 9, further comprising instructions that, when executed by the at least one processor, cause the system to generate a binary encoding of the font tags corresponding to the font training image.

11. The system of claim 10, further comprising instructions that, when executed by the at least one processor, cause the system to generate the filtered tag probability vector by applying an elementwise multiplication between the font tag probability vector and the binary encoding of the font tags corresponding to the font training image.

12. The system of claim 9, wherein the tag-based font retrieval neural network comprises:
   a first fully-connected layer having a power activation function; and
   a second fully-connected layer having a sigmoid activation function that maps output from the first fully-connected layer to a predetermined range.

13. The system of claim 9, wherein the instructions cause the system to train the tag-based font retrieval neural network based on a pairwise loss function that compares a positive pair having a set of font tags and a corresponding font image with a negative pair having the set of font tags and a non-corresponding font image.

14. The system of claim 13, wherein the instructions cause the system to train the tag-based font retrieval neural network by:
  determining a pairwise loss amount based on a difference between an affinity score for the positive pair and an affinity score for the negative pair; and
  back-propagating the pairwise loss amount to layers of the tag-based font retrieval neural network.

15. The system of claim 9, further comprising instructions cause the system to:
  train the font tag recognition neural network to determine the font tag probability vectors for fonts of the plurality of fonts using the font training images and the corresponding font tags;
  upon train the font tag recognition neural network, train the tag-based font retrieval neural network to generate the comprehensive font affinity scores for each of the plurality of fonts; and
  fine tune the font tag recognition neural network and the font tag recognition neural network by jointly training the tag-based font retrieval neural network with the font tag recognition neural network.

16. The system of claim 15, wherein the instructions cause the system to jointly train the tag-based font retrieval neural network and the font tag recognition neural network based on a pairwise loss function that compares a positive pair having a font image and a corresponding set of font tags with a negative pair having the font image and a non-corresponding set of font tags to generate pairwise loss that is back-propagated to both the tag-based font retrieval neural network and the font tag recognition neural network.

17. The system of claim 9, further comprising instructions that, when executed by the at least one processor, cause the system to:
  receive a font tag query comprising a plurality of font tags;
  receive tag based probabilities for the plurality of fonts;
  generate filtered tag based probabilities for the plurality of fonts based on the font tag query and the tag based probabilities;
  provide the filtered tag based probabilities for the plurality of fonts to the trained tag-based font retrieval neural network;
  generate a comprehensive font affinity score for each of the plurality of fonts that indicates a balanced similarity between a given font and all of the font tags of the font tag query; and
  provide, in response to the font tag query, one or more fonts from the plurality of fonts that have favorable comprehensive font affinity scores for the plurality of font tags.

18. The system of claim 9, wherein the font tag probability vectors generated by the font tag recognition neural network indicate the probability of each of the font tags being associated with a font displayed in the font training image.

19. In a digital medium environment for creating or editing electronic documents, a computer-implemented method of recognizing fonts based on font tags, comprising:
  receiving a text-based font tag query comprising a plurality of font tags;
  performing a step for generating comprehensive affinity scores that indicate similarities between a plurality of fonts and the plurality of font tags within the font tag query based on a tag-based font retrieval neural network; and
  providing, in response to the font tag query comprising the plurality of font tags, one or more fonts from the plurality of fonts based on the comprehensive font affinity scores of the one or more fonts.

20. The method of claim 19, wherein providing the one or more fonts from the plurality of fonts by providing the font having the most favorable comprehensive font affinity score to a user device that provided the font tag query.

* * * * *